Figure 1:
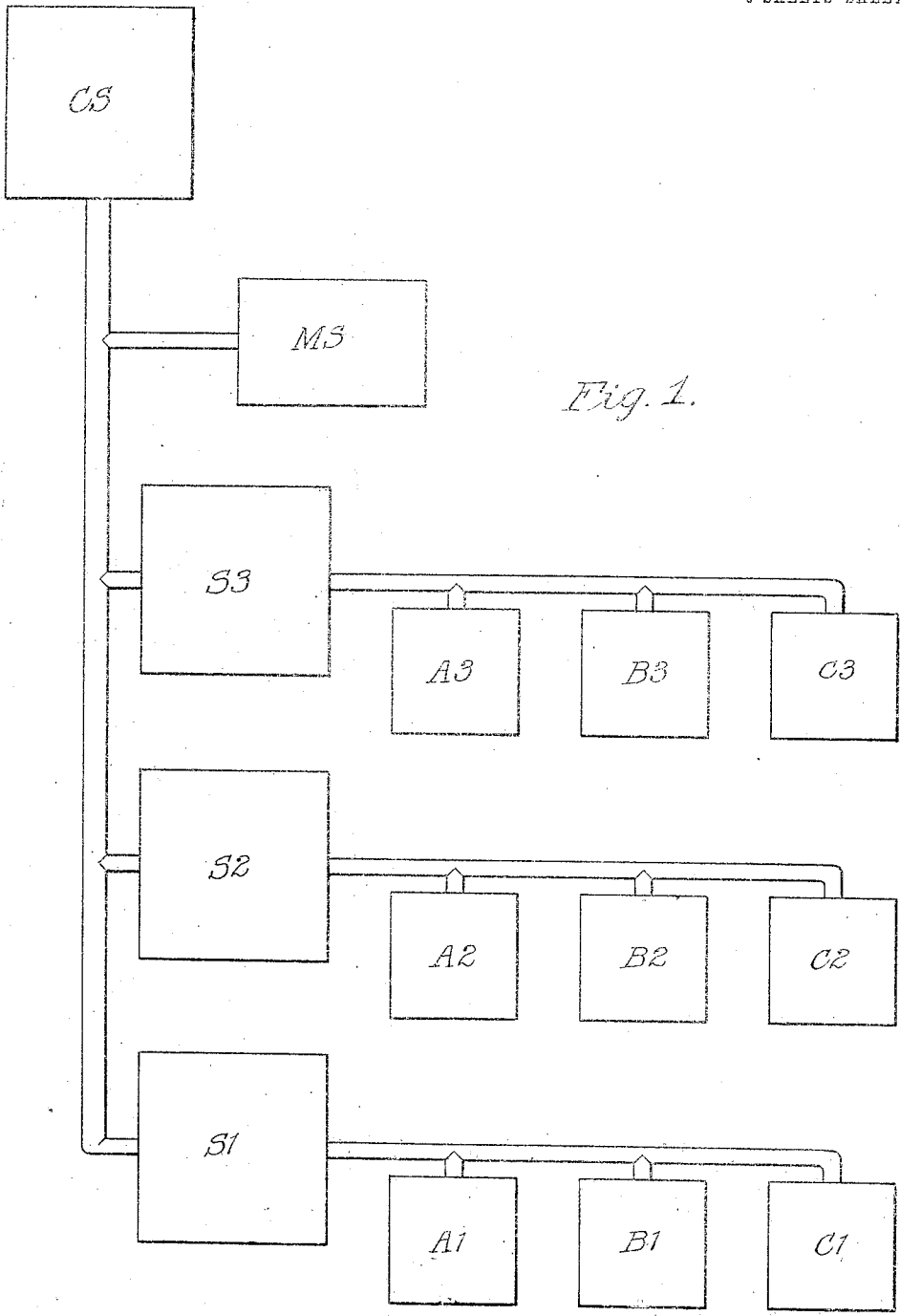

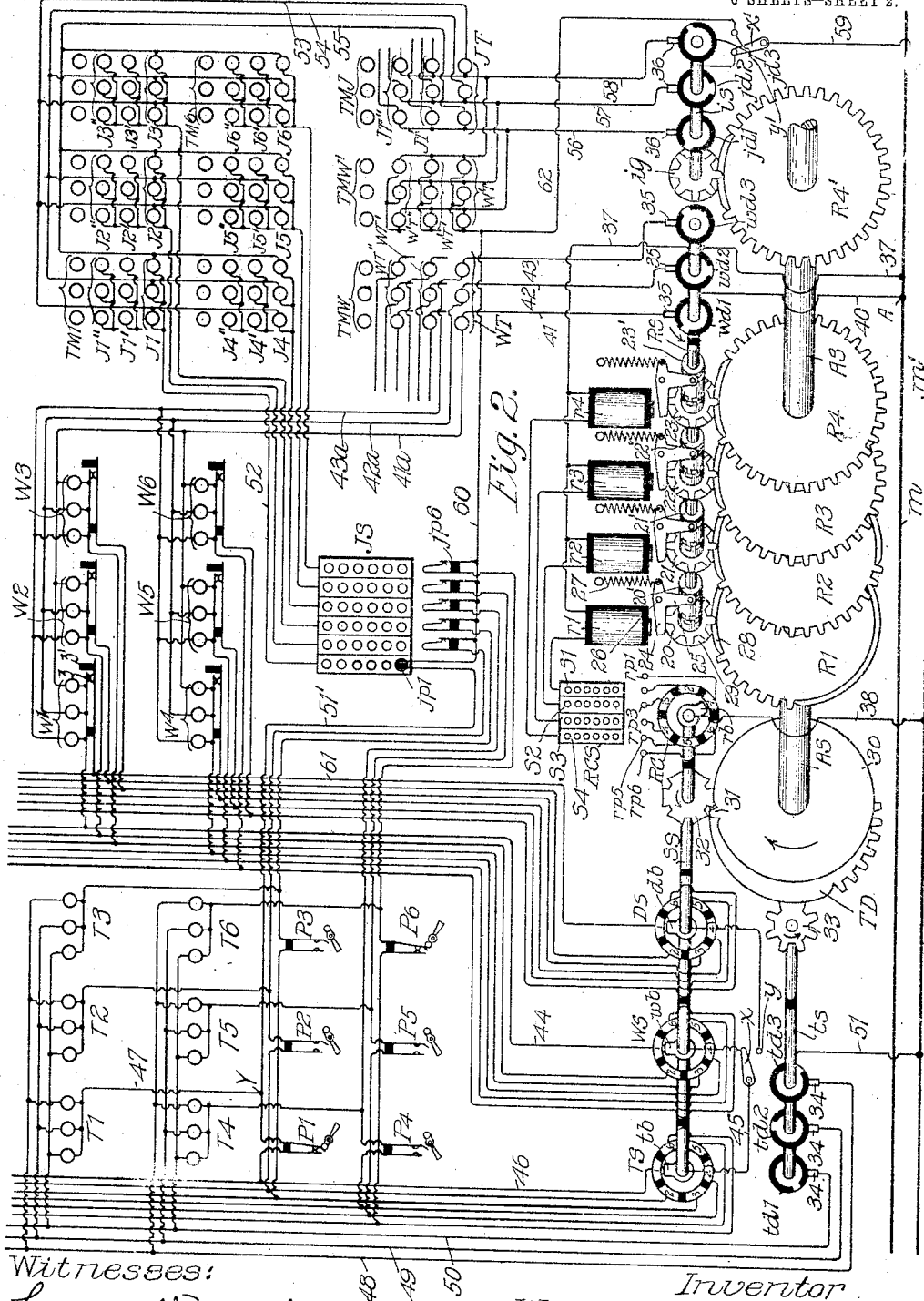
W. J. CRUMPTON.
ACCOUNTING SYSTEM.
APPLICATION FILED MAY 26, 1909.
1,084,613.
Patented Jan. 20, 1914.
6 SHEETS—SHEET 2.
Witnesses:
Leonard W. Novander
George C. Higham
Inventor
William J. Crumpton
By Brown Williams
Attorneys

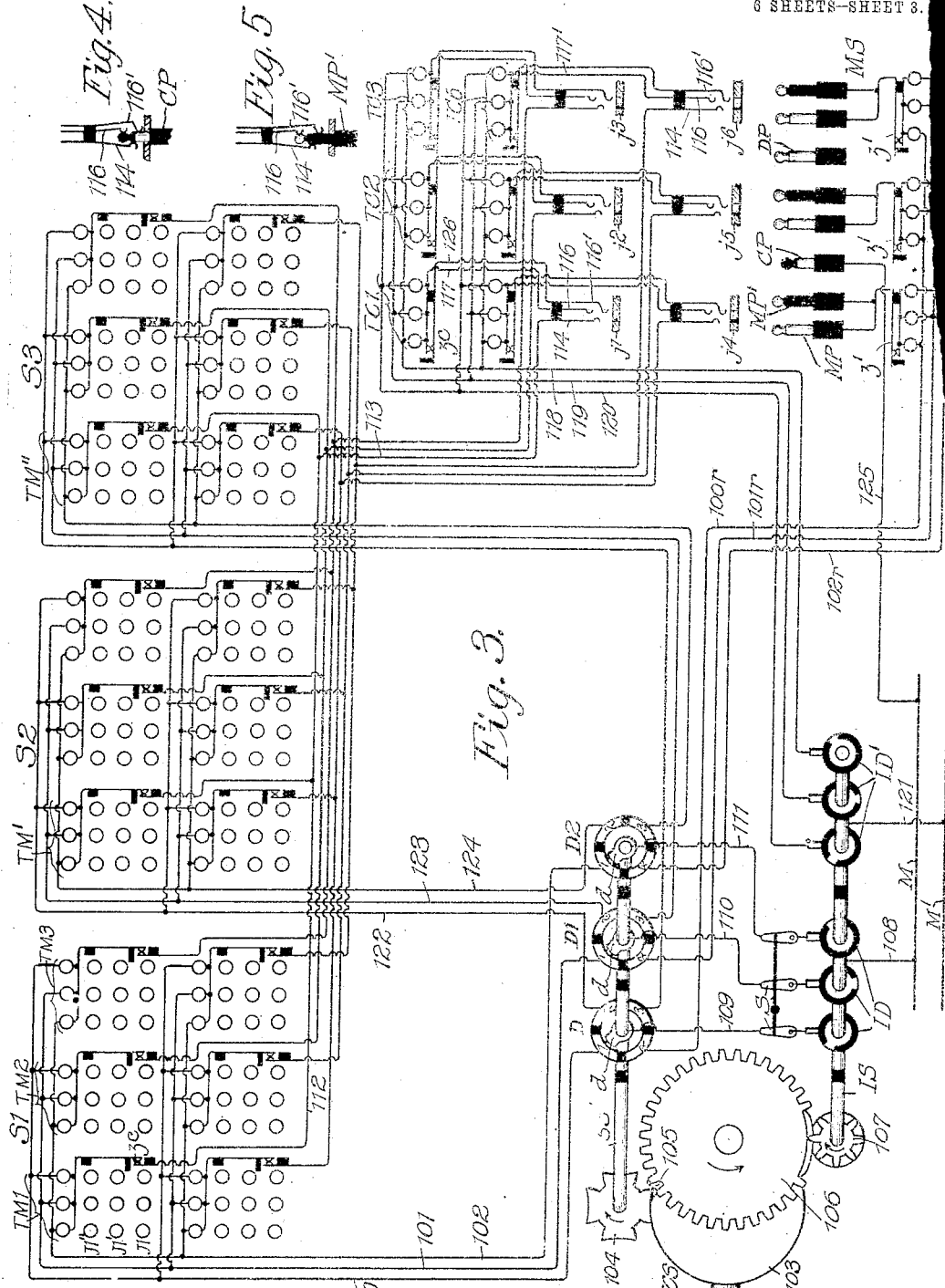

W. J. CRUMPTON.
ACCOUNTING SYSTEM.
APPLICATION FILED MAY 26, 1909.
1,084,613.
Patented Jan. 20, 1914.
6 SHEETS—SHEET 4.
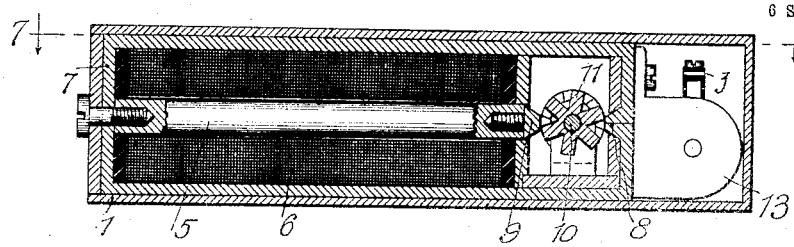
Fig. 6.
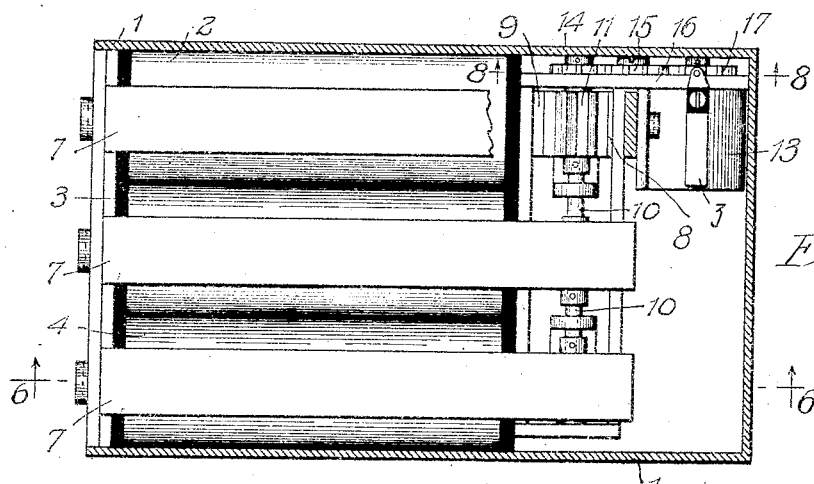
Fig. 7.
Fig. 8.
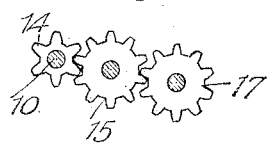
Witnesses:
Leonard W. Nowakk.
George E. Higham.
Inventor
William J. Crumpton
By Brown Williams
Attorneys

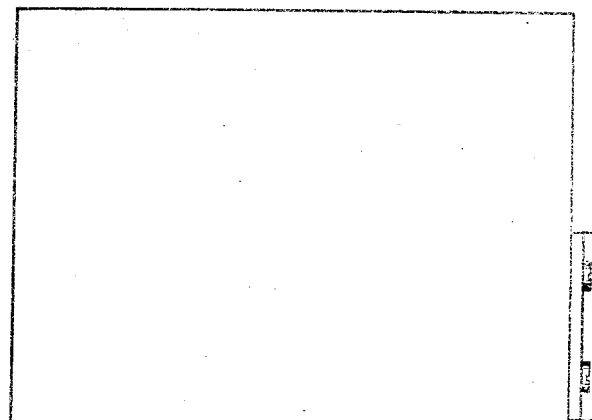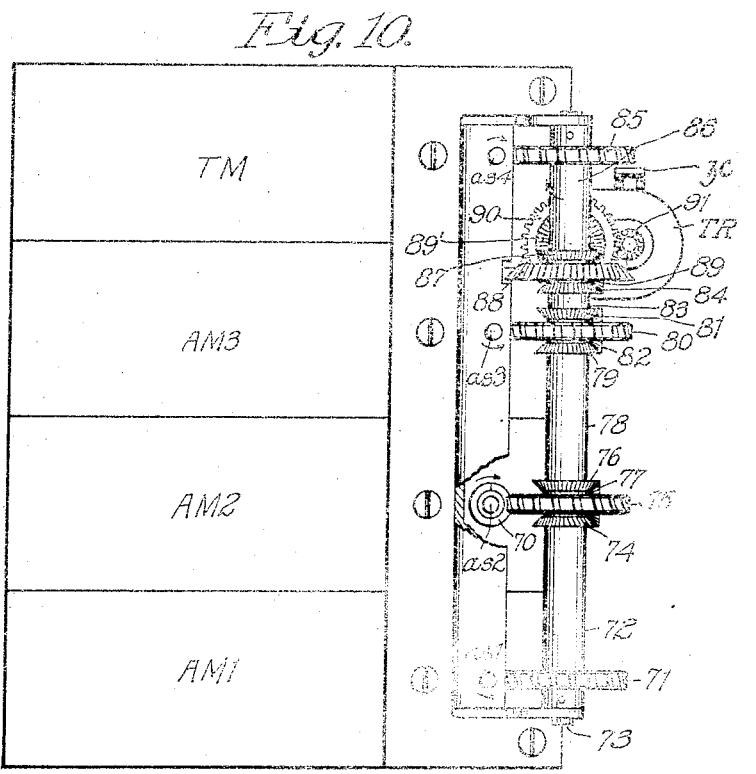

W. J. CRUMPTON.
ACCOUNTING SYSTEM.
APPLICATION FILED MAY 26, 1909.
1,084,613.
Patented Jan. 20, 1914.
6 SHEETS—SHEET 6.
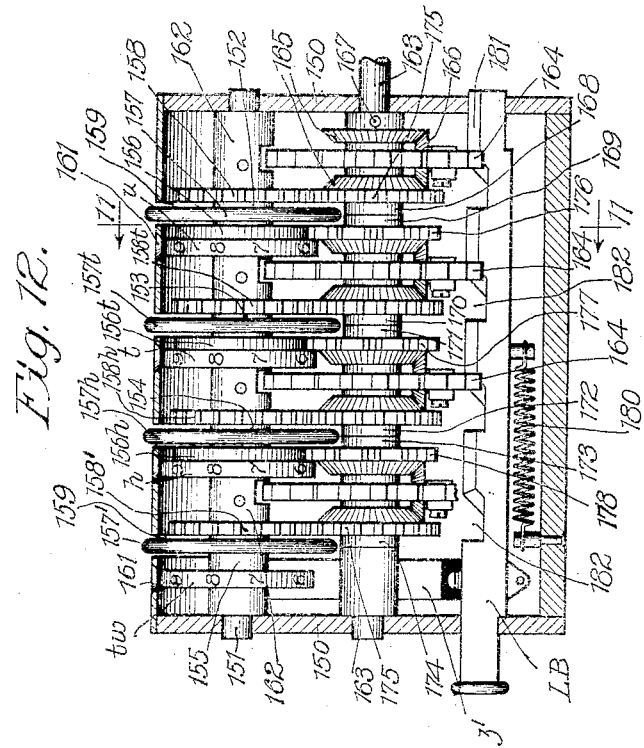
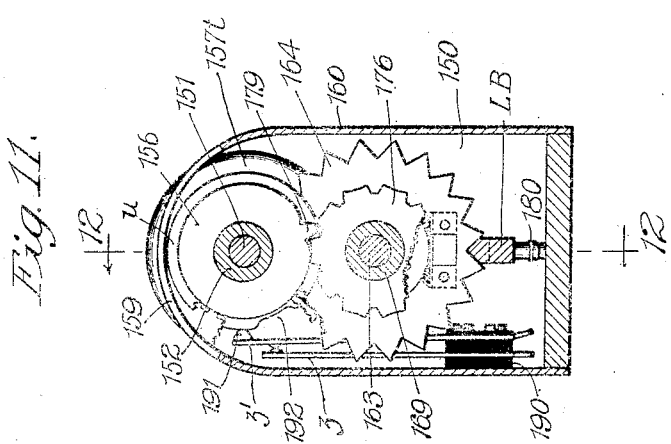
Witnesses:
Inventor
William J. Crumpton
By Brown Williams
Attorneys

UNITED STATES PATENT OFFICE.

WILLIAM J. CRUMPTON, OF EVANSTON, ILLINOIS, ASSIGNOR, BY MESNE ASSIGNMENTS, TO WILLIAM R. HEATH, OF BUFFALO, NEW YORK.

ACCOUNTING SYSTEM.

1,084,613.      Specification of Letters Patent.      Patented Jan. 20, 1914.

Application filed May 26, 1909. Serial No. 498,547.

*To all whom it may concern:*

Be it known that I, WILLIAM J. CRUMPTON, a citizen of the United States, residing at Evanston, in the county of Cook and State of Illinois, have invented a certain new and useful Improvement in Accounting Systems, of which the following is a full, clear, concise, and exact description, reference being had to the accompanying drawings, forming a part of this specification.

My invention relates to electrically controlled and automatically governed accounting systems. It is designed to provide for extensive and complicated accounting transactions of various kinds and is particularly applicable to systems of time-, wage-, job-, and cost-accounting, where the entries made are both functions of time and other factors.

Broadly considered, my present invention is based upon and is an elaboration of the underlying idea shown in my application, Serial No. 437,809, filed June 11, 1908, wherein I have set forth what may be termed a simple system operating on an intercurrent plan. That is to say, the individual registers are so connected with a source of electrical impulses that the actuating current is sent through the registers in succession,—in other words, the registers are "picked up" one after the other. In order to summate the actuations of the individual registers, a totalizer is connected in a common wire forming part of all of the circuits which are successively closed through the electromagnetic actuating mechanisms of the registers.

Now, in the invention which forms the subject matter of this application there are several simple systems which concurrently discharge into a substation. Each substation comprises one or more receiving and transferring mechanisms of which I shall presently speak with more detail. The combination of two or more simple systems and their associated substation might be termed a composite system. According to my invention several of such composite systems may be arranged to discharge into a generic substation, which may or may not be the central receiving station. The combination of several composite systems and the associated generic substation might be properly termed a compound or multiple composite system, according to whether the composite systems discharge separately into the generic station or are coupled together and discharge as one whole into the generic station. Finally, if the conditions demanded it, several of such compound or multiple composite systems could be connected up and led into the central receiving station, where all the grand totals appear.

I might perhaps be able to render the above general statements a little clearer if I give a concrete example of how my invention might be put to actual practice. Let it be supposed that in a certain establishment, a car is to be built. This car will, let us say, constitute job No. 6. There would be provided a grand total register for indicating the total cost of the job. This grand total register might be called the central station register for that particular job. Into this central station there would discharge three substations representative of the metal work, wood work and paint work done in connection with the building of the car. There would also be a separate substation for the entry of the cost of materials. This substation differs from the other substations only in the fact that it is manually controlled while the other substations are time-controlled. Into the "metal work" substation would discharge several simple systems—let us say three—representing the three departments of casting, machine work and forging, in each of which departments would be employed a number of workmen. The "wood work" substation would receive the total cost of the work done in the different wood working departments, say, the department of mill work and that of hand work. The "paint work" substation will receive the total cost of the work done in the various painting departments, as, for instance, the department where the outside finish on paint work is done and the department where the inside finish is taken care of. It will be seen, therefore, that in the above illustration we may have a plurality of simple systems. The three simple systems which have to do with the metal work discharge into a substation identified as the "metal work" substation. The two simple systems which represent the wood work discharge into the "wood work" substation. The two simple systems which have to do with the paint work discharge into the "paint work" substation. These three substations in turn discharge into the central receiving station, where the cost total of the job is indicated. Another way of applying my invention would be in a case where a very large number of men is to be handled. In that instance a simple system might be considered as having a limited capacity, say, one thousand men. Then three simple systems would be used to take care of three thousand men. These simple systems would, as before, discharge into a substation. By simply increasing the number of the simple systems there is hardly a limit to the number of men which might thus be handled. This will give some idea of the great flexibility and adaptability of my invention, especially when it is considered that the system operates with equal facility in the accumulating as well as in the decumulating direction—as will be fully explained in due course.

I have already mentioned that a substation comprises a plurality of receiving and transferring mechanisms, which I call a composite motor unit. These units are of peculiar and novel construction in that they receive the accumulation of individual registers and may discharge such accumulations as fast as they take place or at any time thereafter. In other words, the discharging of these motor units may be either concurrently or intercurrently with the accumulations therein. The decumulations are automatically transferred into a more generic receiving mechanism. As herein shown, several simple systems are arranged to be connected in multiple under the control of one set of electrical controlling mechanisms and to accumulate their entries concurrently into the composite motor units at the associated substation. The substation may be connected to discharge into a more generic station as rapidly as the accumulations appear in the substation, or the accumulations may be held and transferred later into the central station. In other words, a substation is really a sort of reservoir into which entries will, as it were, flow either to be stored therein for future withdrawal or to be withdrawn as they flow in. I have, therefore, called these substations "reservoir substations." Like any reservoir, the inflow into these substations is independent of the outflow therefrom, and vice versa.

The specific circuits herein illustrated, while they provide for the simultaneous discharge of any or all composite motor units of any substation, require that the several or corresponding motor units of the several substations be discharged successively. However, it is obvious that the corresponding units could be connected together by means of differential mechanisms to effect their simultaneous discharge.

Considering my invention from a more specific point of view, it will be found to contain the following among the main characteristics besides those already referred to: Each register or counter is controlled and driven independently of any other counter by means of a "three-phase" motor, so that the amount of its actuation is entirely dependent upon the number of cycles impressed upon the motor. These "three-phase" motors are adapted to actuate the counters in either direction, according to the order in which the electrical impulses are impressed upon the different "phases" of the motor.

To secure actuation proportional to the rate of wages, the wage-register and its connected job-register receive for each different rate a different number of electrical cycles within a given period of time. This is brought about at a centralized point by means of a time-controlled distributer and a source of current. The rate-controlling mechanism is operated from a cross-connecting switchboard, and all that is necessary to change a workman's rate of wages is to change the proper plug-connection in the switchboard, whereby the number of electrical cycles is varied to produce the desired change of rate.

A workman's wage register is operatively connected when the same is started by the workman throwing his switch to the "in" position. For this purpose I have provided means which are so connected into the system that when a workman's plug is out of the jack of the job switchboard, the workman's wage-register is automatically connected with a waste-wage register. When, however, the plug is in the jack, the workman's wage-register is disconnected from the waste-wage register and connected to the job-register. In this way the workman's wages are charged against the proper effective account by the foreman plugging in the proper job-jack after the workman has registered "in."

To provide for the making of entries not functions of time (as, for instance, the cost of material), I have devised a novel form of register which may be quickly adjusted manually to any indication and then connected up in circuit to discharge the initial amount set up into a more generic receiving mechanism. These registers are in fact manually controlled substation units and are used for entering the values of materials, etc.

Many other novel features and arrangements characterizing my invention will present themselves in the course of the detailed description of the embodiment shown in the accompanying drawings, in which—

Figure 1 shows very diagrammatically a compound system comprising simple systems, reservoir substations, and a central station; Fig. 2 shows a simple system connected up to discharge into a substation. The disconnected portions of the composite motor units in the substations are intended to be connected with simple systems such as the one shown in the figure; Fig. 3 shows diagrammatically the circuits and mechanisms for transferring the substation accumulations into a central station and for clearing out the job-registers at the central station, and also for the entry of the cost of materials into the proper job-registers; Fig. 4 is a detail view showing the position of the clearing plug in association with a jack in the switchboard at the central station; Fig. 5 is a detail view showing the position of the material plug in association with the proper jack, for entering the cost of material; Fig. 6 is a cross-sectional view, on the plane 6, 6 of Fig. 7, of the "three-phase" motor; Fig. 7 is a top view of the motor, on plane 7, 7 of Fig. 6, certain of the parts being broken away for the sake of clearness; Fig. 8 is a view on plane 8, 8 of Fig. 7, showing the gearing for transmitting the motion of the armature shaft to the associated register or equivalent; Fig. 9 represents a top view of the composite motor unit; Fig. 10 shows a side view of the same; Fig. 11 is a sectional end view, on plane 11, 11 of Fig. 12, of the manually controlled register which is used in the system for involving any job-register with an entry which is not a function of time; and Fig. 12 is an interior side view of the register shown in Fig. 11, certain of the parts being shown in section taken on plane 12, 12 of Fig. 11.

A general broad idea of how a compound system might be built up in accordance with my invention may be gathered from the diagrammatic representation in Fig. 1. The group of simple systems A1, B1 and C1 is connected with and discharges into the substation S1. In a similar manner the groups of simple systems A2, B2, C2 and A3, B3, C3 discharge into the reservoir substations S2 and S3, respectively. The three reservoir substations discharge into the central station CS, where the grand total registers are located. If we imagine this compound system as established in a factory, one might consider each group of primary systems and the associated reservoir substation as representing a room or floor in the factory, with each simple system representing one of the departments in that room. Whatever work there is done on any job in process, the cost of that job is indicated by the amount of wages earned by the workmen employed on that job in the different rooms and departments will be finally indicated in the proper register in the central station. Each department has, of course, its job-registers for indicating the cost of the job so far as that department alone is concerned. The cost of the work done on the job by the departments on the same floor (in the example assumed) will be totalized and, if desired, indicated in the reservoir station associated with those departments. The totalizations or indications of the reservoir substations are transferred into and totalized by the proper job total register at the central station. The part indicated in Fig. 1 by MS represents the material substation, where the cost of materials, etc., is added to any particular job. The indications at this material substation are added to the indications coming from the reservoir substations. In this way the job total registers at the central station will each indicate the total cost of any particular job.

It will perhaps facilitate an understanding of the system shown in Fig. 1 if I first take up the description of the "three-phase" motor, which is used for operating each of the registers shown in the system. This motor is illustrated in Figs. 6 and 7. Within the casing 1 are housed electromagnets 2, 3, and 4, each comprising a magnetic core 5 and a winding 6. One end of the core of each magnet is held in firm contact with an iron yoke 7, which is of rectangular shape, and on the inner side of the front portion of this yoke is provided a pole piece 8. The core 5 at its front end is provided with a similar pole piece 9. The space between these projections constitutes the air gap of the magnetic circuit for each magnet. On a shaft 10 are mounted three armatures 11, one for each magnet, comprising a series of radial poles. In the instance shown each armature has six poles, but the number may be varied to suit different requirements. The armatures are so secured upon the shaft that the poles of the armatures will not be in alinement, but in properly displaced relation. That is to say, they will be radially displaced with respect to each other. This is indicated in Fig. 6, where the armature of the magnet 4 is shown in cross-section, while the poles of the other armatures are indicated in outline and shown as radially displaced with respect to the poles of the armature belonging to magnet 4. The purpose of this angular displacement of the armature poles is to cause upon successive energizations of the electromagnets, a substantially continuous rotation of the armature shaft 10. For instance, when electromagnet 2 is energized and attracts its armature into a position where it spans the air gap, the armature of the electromagnet next to be energized—viz., magnet 3,—will be moved into a position to be given a one-step movement when electromagnet 3 is energized. Similarly, the energization of electromagnet 3 moves the armature belonging to electromagnet 4 into a position to receive a one-step advancement in the same direction as the other armatures did when the electromagnet 4 is energized. In like manner does the energization of electromagnet 4 place the armature of electromagnet 2 again in position to receive a one-step advancement. This cycle of operation is repeated over and over again as the electromagnets are successively energized. It will be apparent from this that the rate of actuation of shaft 10 depends upon the frequency of the current impulses sent through the windings of the electromagnets. So that by regulating or predetermining the frequency of these impulses, the rate of actuation of shaft 10 may be controlled as desired. It will also be apparent that the direction of rotation of this shaft depends upon the order in which the electromagnets are energized. If the magnets are energized in the order above named, the armatures will actuate shaft 10 in, say, a clockwise direction. If the electromagnets be energized in the reverse order, the armatures will actuate the shaft in the reverse direction. This is due to the fact that the electromagnets will close the iron path for the flux always by the least movement of the armature. For instance, in Fig. 6 the armature of the electromagnet 4 will be actuated in a clockwise direction when the electromagnet is energized. The number of poles in each armature and the angular displacement of the armatures upon the shaft is such that the direction of rotation of the shaft is controlled by the order in which the impulses are impressed upon the electromagnets, as above stated. I have conveniently termed this device a "three-phase" motor, because the current impulses are sent through the motor in cycles of three impulses each. In other words, it might be truly said that my new form of motor is operated by three-phase current-impulses, because the impulses do follow each other in a manner similar to the waves of a three-phase alternating current. I am aware that in ordinarily speaking of a three-phase motor we mean a motor in which rotation is caused by rotating the magnetic field produced by a three-phase alternating current. Although this is not the case with the motor which I have just described, still, because of the analogy between a three-phase alternating current and a three-phase current-impulse, I have designated my motor as a "three-phase" motor. In order, however, to avoid confusion I use the term "three-phase" within quotations when applied in connection with the motor which I have above described.

In working out the system shown in Figs. 1 and 2 I have found it very convenient to employ registers having each associated therewith a motor in which "three-phase" impulses were used, as above described. However, I would have it understood that so far as the motor itself is concerned I do not intend to be limited to a structure employing any specific number of electromagnets, such as three. It should be apparent that this motor is complete in itself and may be used for actuating various other devices besides registers, and in adapting this motor to various other uses it may be found desirable to use a different number of electromagnets. In any event, the number of impulses sent through the motor during every cycle of operation is equal to the number of electromagnets employed. For this reason I should perhaps have used the term "multiphase" in describing my motor, but, as above stated, I have referred to it as a "three-phase" motor because that is the kind of motor which I found convenient to use in connection with the system herein set forth. However, as set forth in certain of the appended claims, I do not intend that my designation of my motor as a "three-phase" motor shall place a limitation upon this feature of my invention.

In Figs. 6 and 7 I have shown a register 13 associated with the motor. The actuations of the armature shaft 10 are transmitted to the register from the gear 14 fixed upon the shaft 10 to the idler 15 mounted in the partition 16 of the motor casing, and thence to the gear 17 of the register. The gear ratio between the actuating shaft 10 and the register is such that the lowest order numeral wheel receives a one space actuation for every electrical cycle sent through the associated motor. I might say right here that when I use the term "cycle" in connection with the operation of the specific embodiment of my system, I mean a set of impulses consisting of an impulse in each phase. It is obvious that register-actuating motors may be used that will actuate the registers by single-phase impulses.

Being now in a position to understand how the "three-phase" motor actuates its associated register, we will turn our attention to the circuit arrangements and various actuating devices shown in Fig. 2. The registers in this figure are each diagrammatically indicated by three circles arranged in a horizontal row. Each row of circles is supposed to represent the three electromagnets of the register actuating motor, no attempt having been made in this diagrammatic showing to indicate the register itself. It will hardly be necessary to explain here that in an establishment where a system is used for automatically taking account of a workman's time and wages, each workman is provided with an individual wage-register and an individual time-register. Besides these there are a number of job-registers, each representing a particular job. When a workman begins work in the morning he throws a switch which automatically sets his wage-register and time-register going, the time-register indicating the time for which he is to be credited and the wage-register indicating the amount of wages which the workman receives during that time in accordance with his particular rate. The cost of any particular job is taken care of by totalizing in the job-register the indications of the wage-registers belonging to the workmen assigned to that job. In Fig. 2 the individual wage-registers are represented by W1, W2, W3, W4, W5, W6. The corresponding time-registers are shown respectively at T1, T2, T3, T4, T5, T6. The registers representative of jobs are indicated at J1, J2, J3, J4, J5, J6. The workmen's individual switches or plugs are indicated at P1, P2, P3, P4, P5, P6. One of these switches is assigned to every workman, and all that the workman has to do when he arrives in the morning or at any time when he begins work is to move his switch to the "in" position, which automatically connects his wage-register and time-register with the actuating mechanism. Switches P1 and P6 are shown in closed position. It will be observed that the number of switches and the number of registers of each kind is six. This is due to the assumption that the simple system shown in Fig. 1 is designed to take care of six workmen.

Before attempting to trace the various energizing circuits, it will perhaps be better to take up first the description of the mechanism that controls the circuits. The actuating shaft AS is adapted to be connected with a suitable source of power for uniform rotation. It is desirable that the rotations of the shaft be time-controlled. Mounted upon this shaft is a series of rate wheels R1, R2, R3, and R4, provided with teeth in the ratios of one, two, three and four, respectively. These rate wheels have associated therewith the gears 20, 21, 22 and 23, respectively. These gears are loosely mounted upon the rate shaft RS and each is associated with a clutch. The movable or shiftable parts of the clutches consist of the sleeves 20', 21', 22', and 23' respectively, keyed upon the shaft RS so as to rotate therewith. It will be observed that the hub of each clutch gear is provided with teeth which are adapted to receive between the spaces thereof the teeth on the adjacent end of the associated clutch sleeve. So that, when the sleeve is actuated toward the gear, the two parts will become locked and the motion of the gear member of the clutch imparted to it by its associated rate wheel will be transmitted through the clutch sleeve to the shaft RS. The position of the clutch sleeves is controlled by the electromagnets r1, r2, r3 and r4. Whenever one of these electromagnets is energized it draws up its armature 24, which forms one arm of a bell crank, the other arm 25 of which engages in a groove in the associated clutch sleeve, so that the latter may be free to rotate. The bell crank being pivoted at 26, it follows that when the arm 24 is drawn up, the arm 25 will force the clutch sleeve to the left into locking engagement with the teeth of the adjacent gear. Upon deënergization of the electromagnet, the clutch sleeve is drawn out of engagement with its gear by the spring 27. As will appear later, no two of the electromagnets are energized at the same time, so that it is impossible for more than one clutch to be in operative position.

From what has been said before respecting the different ratios of the rate wheels R1, R2, R3 and R4, it will be seen that with electromagnet r1 energized, the shaft RS will receive during one revolution of the actuating shaft AS a certain amount of actuation, which we might call unity. With electromagnet r2 energized, the shaft will receive an amount of actuation equal to two, because the rate wheel R2 has a ratio two times that of the rate wheel R1, and will therefore actuate the gear wheel 21 twice the amount that the gear wheel 20 was actuated. With electromagnet r3 energized, the rate wheel R3 will impart to the rate shaft an amount of rotation equal to three, through the clutch controlled by that electromagnet. Finally, with the last rate clutch in operative position, the shaft RS will receive during one revolution of the shaft AS an amount of rotation equal to four times that which the rate wheel R1 is capable of imparting to the rate shaft. In order to prevent accidental rotation of the clutch gear during the interval in which the teeth of the rate wheel are out of engagement with the teeth of the clutch gear, there is mounted beside each rate wheel a locking disk 28, which coöperates with a locking disk 29 mounted beside each of the clutch gears to permit rotation of the clutch gear only when the latter is engaged by the teeth of the associated rate wheel. It will thus be seen that the amount of rotation which the shaft RS will receive in a given period is controlled by the electromagnets r1, r2, r3 and r4.

The mechanism for controlling the circuits of the electromagnets is a very simple one, comprising the rate controller commutator RC. The rate brush rb fixed upon the selector shaft SS is arranged to make successive contact with the segments as this shaft is rotated. In the present instance the rate controller has six segments, the same number that the time-register selector TS and the wage-register selector WS have, because the system has, for the sake of illustration, been designed to take care of six workmen. The number of segments in these selectors varies according to the number of workmen in the system. The segments of the rate controller RC are connected with rate plugs *rp*1, *rp*2, *rp*3, *rp*4, *rp*5, *rp*6, segment No. 1 being connected with plug *rp*1, segment No. 2 with plug *rp*2, etc. The rate brush *rb* is connected with the power main *m'*, the other main *m* being connected through conductor 37 with one end of the rate electromagnets. The other ends of these electromagnets are connected each with a jack strip of the rate controlling switchboard RCS. Thus, magnet *r*1 is connected with jack strip *s*1, magnet *r*2 with jack strip *s*2, etc. Let us suppose that it is desired to operate a workman's wage-register at the rate represented by the rate wheel R1, which is the lowest rate in the system shown. In that case rate plug *rp*1, belonging to workman No. 1, is inserted in any one of the jacks of the strip *s*1. With the rate brush in engagement with segment No. 1 of the rate controller RC, a circuit may be traced from the positive main *m*, through the conductor 37 to the electromagnet *r*1, thence through the strip *s*1, to the rate plug *rp*1, to segment No. 1, to rate brush *rb*, and through the conductor 38 back to the negative main *m'*. It is of course to be understood that the mains *m* and *m'* are connected with a suitable source of electric current. The electromagnet *r*1 being thus energized, will draw the clutch sleeve 20' into engagement with the gear wheel 20, whereby the actuation of the latter by the rate wheel R1 will be transmitted to the rate shaft RS, causing the wage disks *wd*1, *wd*2, *wd*3 to close the circuit through the connected registers a certain number of times during one revolution of the actuating shaft AS.

The amount of movement which the disk 30 imparts to the selector shaft SS through the Geneva wheel 32 during every revolution of the shaft AS, is just sufficient to cause the selector brushes carried by the selector shaft SS to move from one segment to the next succeeding one. So that the rate brush *rb* will remain on segment No. 1 during one complete revolution of the shaft AS. If workman No. 3, let us say, is to be connected with a higher rate than that controlled by rate wheel R3, then his rate plug *rp*3 is inserted in any one of the jacks in strip *s*3. With this connection made, the circuit through the electromagnet *r*3 will be closed when the rate brush *rb* engages segment No. 3. During this engagement the rate shaft RS will be actuated by the rate wheel R3 through the associated clutch gear an amount equal to three times that which it received from the rate wheel R1. This means that the wage disks *wd*1, *wd*2 and *wd*3 will cause three times as many current pulses to flow through the connected registers as was the case when the rate shaft was actuated by rate wheel R1. To put it concretely: If we assume that the lowest rate wheel R1 represents a rate of five cents an hour, the rate wheel R3 will represent a rate of fifteen cents an hour. The gear ratios are such that the number of impulses sent through the connected registers by the wage disks will actuate the registers in accordance with the workman's particular rate. It will be noticed that the rate-controlling circuits are entirely independent of the register-actuating circuits. Upon the shaft AS is also mounted the disk 30, provided with a tooth 31 adapted to enter one of the recesses in the Geneva wheel 32 for actuating the same one step during every revolution of the shaft AS. When the tooth 31 is out of engagement with the wheel 32, the latter is locked against movement. The Geneva wheel 32 is secured upon the selector shaft SS. It will be observed that the wheel 32 has six teeth, so that the selector shaft SS will make one complete revolution for every six revolutions made by the actuating shaft AS. The selector shaft controls the operation of the mechanism which selects the registers for connection with the source of actuating impulses.

As illustrated herein, the time-register selector TS comprises a commutator having six segments, each of which has connected therewith a conductor for carrying the impulses to a particular register, as will presently be explained. A selector brush *tb* is securely mounted on the shaft SS and serves to make contact with the segments successively as the shaft is rotated. The wage-register selector WS is similar in construction to the time selector and has for its function the selecting of the proper wage-register.

The time disk TD, rigidly mounted on the actuating shaft AS imparts one revolution to the associated Geneva wheel 33, mounted upon the time shaft *ts* during each revolution of the shaft AS. During part of the interval in which the actuating shaft AS runs uniformly to make one complete revolution, the shaft *ts* will make one revolution; and during the rest of the interval the shaft *ts* will remain stationary, until the teeth on the disk TD again engage the wheel 33 at the beginning of the next succeeding interval or period. On the shaft *ts* are mounted the time disks *td*1 *td*2, *td*3, having each a peripheral metallic segment to engage a coöperating brush 34. These segments are displayed at an angle of 120 degrees with respect to each other. The function of these time disks is to close a path through the connected time registers.

The rate shaft RS carries the wage disks *wd*1, *wd*2, *wd*3, provided each with a metallic segment for engaging the associated brush 35 to close the circuit through the connected wage-registers. The impulse shaft *is* carries the job disks *jd*1, *jd*2, *jd*3, provided each with a peripheral metallic segment for engaging the associated brush 36 to close a return path for the connected job-registers. This impulse shaft is driven by the actuating shaft AS, by the wheel R4′ engaging the gear *ig* on the impulse shaft. It will be observed that the wheel R4′ has the same number of teeth as the highest rate wheel R4, so that the impulse shaft will receive the maximum amount of actuation during every revolution of the shaft AS.

At JS is shown the job switchboard, consisting of a series of job multiple jacks and a number of plugs *jp*, one for each workman. This switchboard is under the supervision of the foreman in charge of the department which the system represents and is for the purpose of connecting a workman with any particular job to which he may be assigned. The switchboard herein shown comprises six strips of jacks, each strip being permanently connected with one of the job-registers J1, J2, J3, J4, J5, J6. That is to say, the first strip of jacks is connected with job-register J1; strip No. 2 is connected with job-register G2, and so with the other strips of jacks. Any one of the plugs may be inserted in any one of the openings in the switchboard. In the drawing the plug of workman No. 1 is shown as connecting the workman with job No. 1, which is represented by job-register J1. If, for instance, workman No. 6 were to be connected with job No. 4, then plug *jp*6 would be inserted in any one of the openings of jack strip *j*4. The arrangement of the jacks should be such as to permit connection of all of the workmen in a department with the same job.

With this description of the various details of the circuit controlling mechanism, we are now prepared to follow some of the circuits in the operation of the system. Let it be supposed that workman No. 1 moves his switch P1 to the "in" position and that the foreman has inserted the workman's job plug *jp*1 in one of the jacks of the first strip of the job switchboard JS. We will also suppose that the workman's rate plug *rp*1 is inserted in one of the jacks in the strip *s*1 in the rate controlling switchboard RCS, which will connect the workman with the rate clutch operated by the rate wheel R1. If, as above assumed, the rate wheel R1 represents a rate of five cents per hour, the workman's wage register will be actuated that amount during every hour. I might explain now that the rate of rotation of the actuating shaft AS depends upon the number of workmen represented in the system. The present system being designed to take care of six workmen, the actuating shaft may make six revolutions per hour.

Every hour, therefore, each workman's register will be connected with the source of impulses to receive an amount of actuation dependent upon his particular rate. While the shaft AS makes one revolution per man, the selector shaft SS is actuated one-sixth of a revolution, whereby the selector brushes on the shaft are moved from one segment to the next succeeding segment. A brush remains upon a segment during one revolution of the actuating shaft AS, thus keeping the circuit through the connected registers closed a sufficient length of time to permit the register to receive the highest amount of actuation during a period of one hour. Of course, the period in which all of the men are picked up might be other than an hour, but by making the period just one hour, the explanation is simplified.

In the position shown in Fig. 2, the shaft is at the end of a revolution and the disk 30 is about to actuate the selector shaft to move the selector brushes into contact with segment No. 2 of the time selector, wage selector and rate controller. Let us assume, however, that the selector brushes have been moved into contact with the segments No. 1, so that the wage register of workman No. 1 was connected in circuit during the last revolution of the actuating shaft AS. The circuits through the workman's individual registers T1 and W1 will be as follows: Starting at the point A on the positive main *m*, the current passes through conductor 40 to the insulated portion of the shaft RS on which are mounted the wage disks *wd*1, *wd*2 and *wd*3. The workman being connected with the rate clutch controlled by electromagnet *r*1, the rate shaft RS will make one revolution during the period in which the workman's register is connected in. In the period during which the rate shaft RS will receive one revolution from the rate wheel R1, the brushes 35 associated with the wage disks will each come once into contact with the segment on each of the wage disks, thus causing successive impulses to flow through the conductors 41, 42 and 43; or, as above explained, a "three-phase" impulse will be sent through the conductors 41, 42 and 43 during every revolution of the rate shaft RS. Bearing in mind that we call a "three-phase" set of impulses simply a cycle, we can say that for every revolution of the rate shaft RS the wage disks *wd*1, *wd*2, *wd*3 will allow a cycle to pass from the main source of current to the connected registers. This cycle flowing through the conductors 41, 42, 43, will pass into the register WT, which is the wage total register, so called because all of the impulses that flow through the individual wage registers also flow through this wage total register. In this way, the actuations of the register WT represent the sum of the actuations of the individual registers W1 to W6. From the wage total register WT, the impulses will pass through the conductors 41a, 42a and 43a to the wage register W1. It will be observed that all of the wage registers are connected in parallel to the conductors 41a, 42a, 43a, so that the current impulse will flow from these conductors into any register which happens to be connected, it being understood that the registers are selected for actuation successively, one at a time, by the selector devices TS and WS. From the wage register W1, the current passes through the conductor 44, and from there to segment 1 of the wage selector WS. The wage brush wb being in contact with that segment, will conduct the current through conductor 45 to the time brush tb. The switch x included in the conductor 45 is, of course, in the position in which it is shown. From time brush tb, the current passes through segment 1 of the time selector TS to the conductor 46, and thence through the workman's closed switch P1 to the point Y. At this point the current divides into two paths; one of these paths is through the workman's time register T1, as follows: From the point Y to the conductor 47, through the time register T1 to the conductors 48, 49, 50, and from there through the time disks td1, td2, td3 to the conductor 51, back to the negative main m'. As already stated, the gear ratio between the time disk TD mounted on the actuating shaft AS, and the gear wheel 33 mounted on the time shaft ts, is such that the time shaft will make one revolution during the interval that the actuating shaft AS makes one revolution. Now, with the rate shaft connected with the actuating shaft through the lowest rate clutch, it follows that the wage disks will run in synchronism with the time disks. As a matter of fact, so far as this synchronism between the wage disks and the time disks is concerned, it makes no difference how many revolutions the rate shaft RS makes during one revolution of the actuating shaft AS: the first revolution of the rate shaft RS during the interval in which the actuating shaft AS makes one revolution will always be synchronous with the revolution of the time shaft ts. If, during an interval (and by an interval I mean the time during which the shaft AS makes one revolution), the rate shaft RS is geared up to make more than one revolution, the time shaft ts will remain stationary during the additional revolutions of the rate shaft. In other words, no matter at what rate a workman's register is actuated, the rate of actuation of the time registers will always remain the same.

Returning, now, to the tracing of the circuits above commenced, we find that the second path branching from the point Y is through the workman's job register J1 as follows: from the point Y through the conductor 51' to the plug jp1, thence to the conductor 52 through the individual job register J1. From there, the current passes through the conductors 53, 54 and 55 to the job total register JT. From there the current passes through conductors 56, 57 and 58, the job disks jd1, jd2, jd3, through the switch x' and conductor 59, back to the negative main m'. A register operating at a five-cent rate will, therefore, have impressed upon it during an interval one electrical cycle. If a register is connected with a ten-cent rate, it will have impressed upon it two cycles during the interval in which it is selected for actuation. To allow two current cycles to pass through the circuit, the rate shaft RS will receive two revolutions during an interval by the rate wheel R2. For a fifteen-cent rate, the actuating shaft AS will receive three revolutions per interval from the rate wheel R3. Of course, it is to be understood that these specific numbers apply only to the particular drawing of the system as shown in Fig. 2, and that with a different series of rates the gear ratios between the actuating shaft, the rate shaft and the time shaft would be changed correspondingly. It will be noted that the impulse shaft is makes four revolutions during an interval; that is to say, it makes the same number of revolutions as does the highest rate wheel R4. This does not in any way interfere with the actuation of a register at a lower rate, for the reason that it is the wage disks which control the number of impulses that shall pass during an interval. For instance, in the example above assumed, where the register of workman No. 1 is connected in circuit at a five-cent rate, the wage disks wd1, wd2 and wd3 revolved only once during an interval to allow one cycle to pass, thereupon breaking the circuit. So that, although the impulse shaft is made three further revolutions during that interval, no impulses were sent through the registers during those revolutions. In order that the circuit through the individual job registers and the job totalizer be completed, it is necessary that the wage disks and job disks revolve in synchronism.

Inasmuch as the circuits through any of the other wage registers can be readily traced in a manner similar to the circuit traced in detail in connection with wage register W1, I do not deem it necessary to trace the circuits through each one of the wage registers. Thus, for instance, the circuit through wage register W2 would be through segment No. 2 of wage selector WS and time selector TS. The circuit through wage register W5 would be through segment No. 5 of the wage selector and segment No. 5 of the time selector, and so on with the other registers.

The operation of the rate controller is such that when the brushes *tb* and *wb* engage segment 1 of their respective selectors, the rate brush *rb* also engages segment 1, as shown in Fig. 2. Similarly, when the register circuits are closed through segment No. 2 of the wage selector and the time selector, the circuit through the rate controller is closed through segment No. 2. This simply means that the circuit through the registers of workman No. 1 will be closed only when the collector brushes *tb*, *wb* and *rb* engage each their associated segment No. 1. In the same way, the registers for workman No. 2 can be actuated only when the brushes engage segment No. 2, and so on with the other workmen.

Directing attention to the plugs *jp*1 to *jp*6, it will be noticed that each plug has a pair of normally closed contacts; that is to say, these contacts are closed when the plugs are in the "out" position. When, however, any plug is inserted in the switchboard JS, those two contacts are separated. The purpose of this arrangement is to balance the actuations of any individual wage register in some other register, no matter whether the workman's plug is inserted in a jack in the switchboard JS, or happens to be in the "out" position. When we traced the circuit for the wage register W1, we observed that from the switch P1 one branch of the circuit led through the wire 51' to the plug *jp*1, and from there to the conductor 52, to the job register J1. This was because, the plug *jp*1 being inserted in one of the jacks, the spring contacts of the plug were open and the only path for the current was through the conductor 52. However, if the plug *jp*1 had been in the "out" position, as the other five plugs are shown in Fig. 2, then the spring contacts would have been closed and the circuit would have been from conductor 51', through the spring contacts of the plug, to conductor 60, to the waste-wage register W'T, and from there through the conductors 56, 57 and 58 back to the main *m'*. So that, when the workman throws his individual switch into the "in" position, the actuations of his wage register will be balanced either in one of the job registers J1 to J6, or in the waste-time register W'T, depending upon whether his plug is in a job jack or in the idle position. It will be noticed that the conductor 60 is a common conductor for one side of all of the plugs. In this way, any circuit that is closed through the contacts of any plug will be completed through the waste wage register W'T.

It will therefore be understood, from the above description, that the workmen's individual registers are picked up one at a time to be actuated every hour an amount corresponding to a workman's particular rate of wages, and that the individual wage-registers can be actuated only through the wage total register WT. In this way, the totalizer WT will indicate the total of the wages, both productive and non-productive, accruing in connection with the jobs handled by the system. Each of the job registers J1 to J6 will indicate the cost of any particular job so far as that system is concerned; while the job total register JT, through which the circuits of the individual job registers are completed, will indicate the total cost of the jobs taken care of by the system. The waste-wage registers W'T will indicate the amount of non-productive wages; that is to say, wages which accrued to a workman during a period in which he was not assigned to some particular job.

In the precise arrangement shown in Fig. 2, the wage total registers, as well as the workmen's individual wage registers and time registers, may be decumulated,—that is, set back to zero, in the following manner: The switch *x'* is moved to the right in engagement with contact *y'*; while the switch *x* is moved into engagement with the associated contact *y*. The workmen's individual switches P1 to P6 are moved to the "in" position. For the decumulation of the registers, the actuating shaft AS is rotated in the reverse direction from that indicated by the arrow on the disk 30. This will cause the rate shaft RS to rotate in the direction opposite to that indicated by the arrow. In order to decumulate automatically both the time and the wage registers together, the rate shaft RS is connected for actuation with the actuating shaft AS the same as during accumulation. The rate plugs *rp*1 to *rp*6 will therefore all remain in the rate switchboard RCS in their normal positions. If with the shaft RS rotating in the direction indicated by the arrow, the registers are actuated forwardly by the "three-phase" current impulses, a reversal of the order in which the impulses are impressed upon the registers will result in the actuation of the register in the reverse or backward direction. This was fully explained in connection with the detailed description of the "three-phase" motor shown in Figs. 6 and 7. The decumulating circuit may, therefore, be traced from the point A to conductor 40, through the wage disks to conductors 41, 42, 43, into the wage-total register WT, thence to conductors 41*a*, 42*a*, 43*a*. From these conductors the circuit will be completed successively through the individual wage registers to the discharge selector DS. When we traced the accumulating circuits of the wage registers (or, to be more specific, that of the wage register W1), we found that from register W1 the current passed through conductor 44 to the wage selector WS and from there to the time selector. However, inasmuch as the switch $x$ is, during the discharge, in the position where it engages the contact $y$, the connection between the wage selector and the time selector is broken and the discharge brush $db$ is connected with the time brush. This means that the decumulating circuit of the wage register must be completed through the associated contacts $z$ to conductor 61, segment 1 of the discharge selector DS, thence to segment 1 of the time selector, through conductor 46 to plug P1, thence to point Y. There the circuit divides in the manner explained when the accumulating circuit was traced, except, however, that the return path for the wage registers will be not through the job registers as before, but will be through the plugs $jp1$ to $jp6$, conductor 60, conductor 62, contact point $y'$, switch arm $x'$, and through conductor 59 to the negative main $m'$. The contacts $z$ associated with each wage register are controlled by the highest-order numeral wheel of the register; that is to say, these contacts are normally closed and remain closed until the highest-order numeral wheel has just passed beyond zero. At that instant, a suitable projection on the highest-order wheel strikes the insulated extension $z'$ carried by one of the contacts, and forces the contacts apart, thus breaking the circuit through the register. The contacts remain open until the register is again actuated forwardly. I have shown these contacts in connection with the register illustrated in Figs. 6 and 7, but I have not thought it essential to illustrate the interior mechanism of the register to show how the highest-order numeral wheel opens these contacts when the register passes through zero. One way of carrying this detail out in practice is shown in my application referred to in the beginning of this specification. Obviously, various ways may be devised for accomplishing the same purpose. For instance, in Fig. 11 which will be described in detail later on, I have shown a pair of normally closed contacts which are separated when the register passes through zero by one of the contacts dropping into a depression or recess in the highest-order numeral wheel. In this particular arrangement, the resiliency of the springs constituting the contacts is such that they normally tend to separate, but are not permitted to separate until the moment when the register passes through zero. In the arrangement above described in connection with the wage registers, the zero contacts $z$ normally tend to remain closed and are forced apart by the highest-order wheel when it passes through zero. Any other means may be employed for automatically cutting the register out of circuit as soon as it is discharged or decumulated.

The decumulating circuits of the other individual wage registers are similar to the circuit which we have just traced in connection with the wage register W1. The thing to be borne in mind in this connection is that during the discharging, the circuits of the wage registers are all closed through the associated zero contacts, and from there through the different segments of the discharge selector DS. Thus, the zero contacts of wage register W2 connect with segment 2 of the discharge selector; the zero contacts of register W3 connect with segment 3 of the discharge selector, etc. As soon as any one register has been brought back to zero, it will be automatically cut out of circuit without any attention whatsoever on the part of the individual in charge of the decumulating. The decumulation of the registers will usually take place during the night, or at a time when the system is not accumulating.

To this description of the simple system shown in Fig. 2, I have to add that other such simple systems may be connected to be controlled by the same and similar mechanism that controls the first system. For instance, the time registers of the second and third systems would be connected to the conductors 48, 49 and 50. The workmen's individual switches would be connected onto the conductors which lead to the segments of the time selector TS, while the individual wage-registers would be connected with the six conductors which lead to the six segments of the wage-selector WS. The job switchboard would, of course, be duplicated and the individual job registers connected in a manner similar to the connections of the individual job registers J1 to J6. For instance, job register J1' of the second system would be connected with the first strip of jacks of a job switchboard, just as the job register J1 of the system shown is connected with the first strip of jacks of the switchboard JS. The job registers J1' to J6' of system No. 2 are connected with the job totalizer JT', just as the individual job registers J1 to J6 of system No. 1 are connected to have their accumulations totalized in the job total register JT. In like manner are the individual job registers J1'' to J6'' of the third system to be connected with their totalizer JT''. Systems 2 and 3 have waste-wage registers W'T', W'T'' respectively, arranged each to be connected with the plugs of the associated switchboard, just as the waste-wage register W'T of system No. 1 is connected with the plugs $jp1$ to $jp6$. The current passing through the conductors 41, 42 and 43 from the wage disks, will find parallel paths through the wage totalizers of the three systems, just as the corresponding registers of the individual systems are connected up in parallel. The wage total registers for systems No. 2 and 3 are indicated respectively at WT' and WT''. In other words, while the individual registers of each system operate intercurrently, the corresponding registers of the systems operate concurrently in parallel circuits. With this arrangement, there is the limitation that the corresponding wage registers can operate only at the same rate. So that, if workman No. 1 of system No. 1 works at a five-cent rate, workman No. 1 of system No. 2 will also be connected up at that rate, and the same with workman No. 1 of system No. 3. However, this arrangement may in many cases not be found undesirable or objectionable. In case it is imperative that the corresponding wage registers of the several systems should be capable of operating at different rates, it is only necessary to provide each system with a circuit controlling mechanism similar to that shown in system No. 1. With the systems connected in parallel with a common controlling mechanism, it is not necessary that the corresponding individual job registers shall operate at the same rate. For instance, if job register J1 of system No. 1 is actuated through the job totalizer JT at the rate of say five cents an hour, the corresponding job register J1' of system No. 2 may be actuated through the associated job totalizer JT' at the rate of twenty cents an hour.

I might, perhaps, at this point call attention to the three isolated circles appearing in connection with each of corresponding registers of the several systems, as indicated in the upper right hand portion of Fig. 2. It will be remembered that in the introductory part of this specification I referred to reservoir substations into which the simple systems discharged, these substations consisting of composite motor units for accumulating the actuations of the simple systems and transferring them into the generic or grand-total registers at the central station. These composite motor units consist each of a transfer member and as many accumulating members as there are systems discharging into the substation. In the particular embodiment of my invention as illustrated in Fig. 2, there are three simple systems discharging into a substation. In such a substation, each motor unit will, therefore, consist of three accumulating members. In Fig. 2, there are indicated nine composite motor units. The three accumulating members of each motor unit are represented by the registers J1, J1', J1'' to J6, J6', J6''; WT, WT', WT''; W'T, W'T', W'T''; and JT, JT', JT''. The transfer members associated with these sets of accumulating members are diagrammatically indicated by the three isolated circles appearing above each set of accumulating members, and lettered TM1 to TM6, TMW, TMW' and TMJ, respectively. Considering, for the sake of illustration, the first or the composite motor units indicated in Fig. 2, the registers J1, J1' and J1'' are so connected together that their actuations are totalized by the register of the transfer member TM1. This register is provided with a pair of zero-contacts for automatically opening the circuit through the electromagnets associated therewith whenever the register is brought to zero. The transfer register is adapted to be actuated by its mechanism in a direction reverse to that in which it is actuated by the accumulating members J1, J1', J1''. Whenever, therefore, the transfer register is actuated above zero by the associated accumulating members, the circuit through the actuating mechanism of the transfer register is automatically closed, and the register is set back to zero by being discharged into the proper generic register at the central station. Before, however, taking up the circuit arrangements whereby the transfer or discharging is effected, it will be best to refer in detail to the structure of the composite motor unit as shown in Figs. 9 and 10, in order to first arrive at an understanding of the precise operation of this mechanism.

The accumulating members AM1, AM2, AM3, consist each of the "three-phase" motor device shown in Figs. 6 and 7 and already described in detail. The armature shafts $as1$, $as2$ and $as3$, respectively, of these accumulating members are each provided with a worm gear 70. In this way the shaft of member AM1 is connected with the spiral gear 71. This gear is connected with the sleeve 72, which is rotatably carried by the vertical shaft 73. The upper end of this sleeve is provided with the bevel gear 74, which constitutes one of the side members of a differential set, of which the central member is the spiral gear 75 and the other side member the bevel gear 76. The spiral gear 75 is connected with the armature shaft $as2$ through the worm gear 70. The side members 74 and 76 are connected together by the bevel pinion 77, pivotally carried by the spiral gear 75. The bevel gear 76 is mounted upon one end of the sleeve 78, rotatable on the shaft 73. The upper end of this sleeve is provided with a bevel gear 79, which constitutes one of the side members of a differential set similar to the one just described. The central member 80 of this differential set is connected with the armature shaft $as3$ through a worm gear. The bevel gears 79 and 81 are connected together by the bevel pinion 82, pivoted in the spiral gear 80. The bevel gear 81 is carried by one end of the sleeve 83, the other end of which terminates in the bevel gear 84. As already explained, the accumulating members are positively actuated by the three-phase current impulses sent through the windings.

In order that these actuations may be properly totalized, the respective armature shafts of these members are actuated in reverse directions, as indicated by the arrows in Fig. 10. It will be apparent that by means of this differential connection between the armature shafts of the accumulating members AM1, AM2, AM3, the actuations of these members are accumulated, so that the rate of actuation of the bevel gear 84 will be equal to the sum of the rates of actuation of the individual accumulating member. So far as accumulating the actuations of the members AM1, AM2, AM3, it is not necessary that the armature shafts of these members be connected to individual registers. It may in certain instances be desirable to do so in order to have separate indications of the amount of actuation of each accumulating member. In this case the armature shaft of each accumulating member may be connected with a register, as shown in Figs. 6 and 7, and as diagrammatically indicated in Fig. 2 by J1, J1', J1'', etc., etc. The transfer member TM also consists of the "three-phase" actuating device shown in Figs. 6 and 7, the same as the accumulating members. The armature shaft $as4$ of the transfer member is connected with the spiral gear 85 through the worm 86'. This spiral gear is mounted upon the upper end of the sleeve 86, the lower end of which is provided with the bevel gear 87. The bevel gears 87 and 84 constitute the side members of a differential set, of which the central member is the large bevel gear 88. The bevel pinion 89, pivotally carried by the central gear 88, connects the side gears 87 and 84. The large bevel gear 88 meshes with the small bevel gear 89'. which is rigidly connected with the gear 90 and supported on a shaft not shown. The gear 90 meshes with the pinion 91 carried by the actuating shaft of the transfer register TR. With this construction it will be seen that the motion of the bevel gear 84, if we imagine sleeve 86 to be stationary, is transmitted to the central gear 88 by the pinion 89 climbing around the bevel gear 87. From gear 88 the motion is transmitted to the register through the interposed gear just described. Any one or more of the motors in the composite motor unit may be run as a transfer motor irrespective of the actuation of the others, and the same is true in regard to accumulation actuations. Now, the transfer register TR is provided with zero contacts $zc$ similar to the individual wage-registers as previously described.

In the diagrammatic representation of Fig. 2 the register has been entirely omitted from the composite motor units, in order not to complicate the drawing unnecessarily. These zero contacts are adapted to open the circuit through the electromagnets of the transfer member every time the register reaches zero. However, as soon as the register passes above zero, the contacts are closed and the shaft $as4$ actuates the sleeve 86 in the direction indicated by the arrow in Fig. 10. This actuation of the sleeve is transmitted to the large bevel gear 88 and from there to the register, to actuate the same in a reverse direction. In other words, supposing that the transfer register TR is at zero, the circuit through the electromagnets of the transfer member TM will, therefore, be opened and the sleeve 86 will be stationary. The actuations of the accumulating members will be transmitted into the transfer register through the path previously described. As soon, however, as the register is actuated above zero, the contacts $zc$ are closed. This completes the circuit through the electromagnets of the transfer member, and the sleeve 86 is actuated to bring the register back to zero by actuating it in the reverse direction. As soon as zero is reached the circuit through the transfer member is again interrupted and the register again accumulates. This cycle of operation is repeated over and over again, and the entries made in the transfer register may be withdrawn or transferred as fast as they are made, or subsequently.

We shall presently learn that the same number of impulses which pass through the transfer member to bring the register back to zero also pass through a totalizing register at the central station. In this way it will be seen that the actuations of the individual accumulating members in a substation are transferred and totalized into the central station. However, it is not necessary that this transfer take place as fast as the accumulations occur. We shall see later on that the circuits of the transfer member may be held open even though the transfer register is above zero. This permits the individual accumulating members to be totalized in the transfer register and held therein for transfer at some future time. The transfer motors comprising a substation operate concurrently; but the corresponding motors of the different substations operate successively, as shown in the drawings. This will be made apparent when we take up the description of the transfer or discharging circuits and controlling devices shown in Fig. 3.

It will now perhaps be appreciated why I have come to designate the substations as reservoir substations. The inflow produced by the accumulating members is entirely independent of the outflow, which is controlled by the transfer member. The inflow may either be stored in the reservoir for future withdrawal, or the withdrawal may take place as the inflow accumulates. Just how the composite motor units transfer the actuations of the accumulating members into the proper register at the central station is best learned from a description of Fig. 3, which shows the transfer circuits of three substations leading into a central station. In this figure S1 indicates as a whole the substation shown in Fig. 2,—that is to say, the substation S1 in Fig. 3 is the receiving station for three simple systems, of which the first one is illustrated in Fig. 2. However, in Fig. 3, I have omitted the three composite motor units whose transfer members are in Fig. 2 indicated by TMW, TMW' and TMJ. This omission has been made solely for the sake of clearness and simplicity. The transfer circuits leading from these composite motor units are similar to those leading from the other six motor units of that substation, and it would have unnecessarily encumbered Fig. 3 if an attempt had been made to include the omitted motor units and their circuit connections. For the sake of illustration, therefore, we may consider the substation S1 to consist of the six motor units whose accumulating members are made up of the individual job-registers J1, J1', J1'', etc., as marked in Fig. 2.

Inasmuch as Fig. 3 concerns itself only with the transfer and clearing features of my invention, I have indicated the accumulating members of each composite motor unit by three isolated horizontally arranged circles, just as in Fig. 2 the transfer members of the motor units were shown disconnected, for the reason that we were then not concerned with the transfer circuits. The substation indicated as a whole by S2 in Fig. 3 is the receiving station for a second group of three simple systems; while substation S3 is the reservoir for a third group of three simple systems. The simple systems connected with each substation are very diagrammatically indicated in Fig. 1, to which attention was directed in the fore part of this specification.

Fig. 3 shows in detail the connections between the substations and the central station, and thus might be said to begin where Fig. 2 leaves off. The transfer operations of the system can best be explained by selecting any one of the composite motor units (as, for example, the first motor unit of substation S1) and tracing the circuit connections therefor. The electromagnets of the transfer member TM1 are connected through the conductors 100, 101 and 102 to segments No. 1 of the selectors D, D1, D2. The transfer members of the other composite motor units of substation S1 are connected in parallel to the conductors 100, 101, 102. With each of the selectors is associated a selector brush $d$, carried by the selector shaft SS'. This shaft is actuated by the transfer controller shaft TCS through the medium of the one-toothed disk 103 mounted on the shaft TCS, and the Geneva wheel 104 mounted on the selector shaft SS'. With the shaft TCS rotating in an anti-clockwise direction the Geneva wheel 104 will be engaged by the tooth 105 on the disk 103 and given a one-quarter of a revolution. This will take place once during every revolution of the shaft TCS. The gear wheel 106, secured upon the shaft TCS, engages the gear 107 carried by the impulse shaft IS. In the particular embodiment illustrated the transmission ratio between the gears 106 and 107 is such that the shaft IS makes four revolutions to every one revolution of the shaft TCS.

In transferring the accumulations from any one composite motor unit to the corresponding totalizing register at the central station, the discharge plug DP is inserted in the proper jack of the central station switchboard. In Fig. 3 six of these jacks are shown at $j1$, $j2$, $j3$, $j4$, $j5$, $j6$, one for the corresponding composite motor units of the several substations. Thus, to discharge motor unit No. 1 of the substation S1, plug DP is inserted in jack $j1$. The circuit of the transfer member TM1 may now be traced as follows: from the main conductor M to conductor 108, to the impulse disks ID, from there through the switch S to the conductors 109, 110, 111, to the selector brushes $d$ of the selectors, segments No. 1 of the selectors, conductors 100, 101, 102, through the transfer member TM1, the associated zero contacts $zc$ (which, as already stated, are closed as long as the register indicates above zero), to conductor 112, conductor 113, spring contact 114, discharge plug DP, the other spring contact 116, conductor 117, through the totalizing register TC1, conductors 118, 119, 120, impulse disks ID', and through the conductor 121 back to the negative main M'. This circuit remains closed during one revolution of the shaft TCS, whereupon the disk 103 will actuate the selector shaft SS' one quarter of a revolution and bring the selector brushes $d$ into engagement with segments No. 2 of the selectors. During the interval that the selector brushes engage segments No. 1 the transfer member TM1 will receive four impulses in a direction to cause reverse actuation of the transfer register. Inasmuch as the two sets of impulse disks mounted on the shaft IS run in synchronism and have the corresponding segments in the same angular position, the impulses passing through the transfer member TM1 will also pass through the totalizing register TC1 to actuate the same in a forward direction. When the selector brushes $d$ engage segments No. 2, transfer member TM1 of substation S2 is connected into the transferring circuit. The circuit through this transfer member will be the same as that just described in connection with transfer member TM1 of substation S1, except, of course, that the impulses will pass across segments No. 2 through conductors 122, 123 and 124 to the transfer member TM1', thence through the associated zero contacts to the common conductor 112. From there on the circuit is as traced above in connection with the transfer member of substation S1. When the shaft SS' is actuated to bring the selector brushes d into engagement with segments No. 3, transfer member TM'' of substation S3 is selected for discharging into the totalizing register TC1. From this it will be seen that the corresponding transfer members at the different substations are selected successively one at a time for discharging into the proper register at the central station. However, the transfer members of any one substation, being all connected in parallel, will discharge concurrently into their respective totalizing registers. Thus, transfer member TM2 of substation S1 will discharge into totalizing register TC2 concurrently with the discharge of transfer member TM1 into totalizing register TC1, provided, of course, that a discharge plug is inserted in the jack j2. Transfer member TM3 of substation S1 will discharge into the totalizing register TC3 across the contacts of jacks j3, etc., with the other transfer members.

I will now explain how the totalizing registers may be cleared. To do this it is only necessary to insert the clearing plug CP into the jack of the register to be cleared, and to open the switch S. Let us suppose that register TC1 is to be cleared and that the clearing plug CP is inserted in the jack j1. The circuit may then be traced as follows: from the positive main M to conductor 125, clearing plug CP, spring contact 116' of jack j1, conductor 126, then across the zero contacts zc, through the register TC1, conductors 118, 119 and 120, impulse disks ID', thence through conductor 121 back to the negative main M'. As may be seen from the detail view of Fig. 4, when the clearing plug is inserted in a jack the spring contacts 114 and 116 engage the insulated head of the clearing plug so that no circuits can be closed through these contacts. As soon as the register has reached zero, the associated zero contacts zc are automatically opened, as already explained, and actuation of the register beyond zero is prevented. In the same manner may the other total cost registers be cleared by simply inserting the clearing plug in the proper jacks.

I have yet to explain the mechanism by which any desired amount may be entered into any one of the totalizing registers in addition to the amounts transferred into these registers from the substations. It is obvious that the total cost of a job will consist of more than merely the amount of wages paid out. There is, for instance, the cost of material to be included. It is the function of the register shown in Figs. 11 and 12 to involve any one of the total cost registers with any predetermined entry. I shall take up the description of the structure as shown in these figures before attempting to trace the circuits in Fig. 3 for adding the cost of material or any other similar entry into any one of the total cost registers.

In the end members 150 of the housing inclosing the register mechanism is mounted the stationary supporting shaft 151. Upon this shaft is rotatably mounted a series of sleeves 152, 153, 154 and 155. Upon the sleeve 152 are secured the units wheel u, the carrying wheel 156, the hand wheel 157 and the gear wheel 158. Similarly, upon the sleeve 153 are rigidly mounted to rotate together the tens wheel t, the carrying wheel 156t, the hand wheel 157t and the gear wheel 158t. Upon the sleeve 154 are secured the hundreds wheel h, the carrying wheel 156h, the hand wheel 157h and the gear wheel 158h. Upon the sleeve 155 are rigidly mounted the thousands wheel tw, the hand wheel 157', and the gear wheel 158'. The highest order numeral wheel has, of course, no carrying mechanism associated therewith. The hand wheels extend through openings 159 in the casing 160, in which the mechanism is housed. On top of the casing are the sight openings 161 for the numeral wheels. The sleeves on which the four numeral wheel sets above described are mounted are separated by the spacing members 162. The actuating shaft 163, mounted in the ends of the casing, is adapted to be actuated by a "three-phase" motor device such as is shown in Figs. 6 and 7 previously described. Upon this actuating shaft is mounted a series of differential sets comprising each a central gear 164 and two side gears 165. The pinion 166, mounted in the central gear 164, engages the side gears 165. The first of the bevel gears 165, viz., that shown adjacent to the right hand partition 150, is firmly fixed upon the shaft 163 as by means of the pin 167. The adjacent side members of the first and second differential sets are secured to the sleeves or hubs 168 and 169, respectively, loosely mounted on the shaft 163. Likewise, the loose hubs 170 and 171 support the adjacent side members 165 of the second and third differential sets. The hubs 172 and 173 carry the adjacent bevel gears 165 of the third and fourth differential sets. The sleeve member 174 carries the last of the side gears of the fourth differential set. Upon each of the hubs 168, 170, 172 and 174 is also mounted an actuating gear 175. These actuating gears engage the gears 158, 158t, 158h and 158', which are associated with the different numeral wheels as just described. The hubs 169, 171 and 173 have also mounted thereon the carry-over wheels 176, 177 and 178 respectively. These carry-over wheels are adapted to be actuated by the tooth 179 provided on each of the carrying wheels, the amount of actuation being one-tenth of a revolution every time that the associated carrying wheel makes one revolution. This is one usual form of carry-over mechanisms in registers or counters where the actuations take place through the units wheel. In the lower part of the casing is slidably mounted the locking bar LB normally held by the tension spring 180 in the position in which it is shown in Fig. 12. That is to say, the bar is normally held in a position in which the locking edges 181 all engage the toothed wheels 164 of the differential sets. With the parts in the position shown in Fig. 12, with the differential sets locked, it will be apparent that motion to the numeral wheels can be transmitted only through the lowest order wheel by means of the shaft 163. However, with the locking bar LB pushed in so that lower portions of the central gears 164 would be accommodated in the recesses 182 whereby the differential gears are free to operate, each numeral wheel may be rotated by means of the associated hand wheel independently of and without actuating any of the other numeral wheels. In this way an amount can be very quickly set up in the register by simply rotating each numeral wheel the necessary amount. For instance, if it is desired to set up in the register the amount $84.95, the thousands wheel *tw* is turned by means of the hand wheel 157' until the figure 8 shows in the sight opening. This turning of the wheel *tw* will be permitted by the rotation of the central wheel 164 of the adjacent differential set, which is the fourth set. It should be remembered, of course, that the carry-over wheel 178 will be locked by the associated carrying wheel 156*h*. Such locking engagement between a carry-over wheel and its associated carrying wheel may be seen from Fig. 11, where the carry-over wheel 176 is locked against rotation by the carrying wheel 156 because of the ordinary Geneva stop arrangement between the two wheels. When the thousands wheel *tw* is thus rotated, the bevel pinion 166 of the fourth differential set will climb around the bevel gear mounted on sleeve 173. Returning to the setting up of the given amount, the hundreds wheel is next actuated until the number 4 shows under the sight opening; the tens wheel is actuated until the number 9 appears, while the units wheel is actuated until the number 4 shows in the sight opening. The numeral wheels may be actuated forwardly or reversely with equal facility, and it does not matter in which order the wheels are actuated. The differential connections between the actuating shaft and the numeral-wheels will cause the latter to alternate in their direction of rotation. Thus, if we regard the units-wheel as rotating away from the observer, the tens wheel will rotate toward the observer, the hundreds wheel again away from and the thousands wheel again toward the observer. The numbers, therefore, on the first and third wheels run in the reverse direction from the numbers on that of the second and fourth wheels. It is, of course, obvious that the numeral-wheels may all be made to rotate in the same direction by interposing an idler between the actuating gear 158 of every other numeral-wheel and the gear 175.

Let us now see how an entry thus set up in the register mechanism may be transferred into one of the registers TC1 to TC6 at the central station, as indicated in Fig. 3. In this figure, I have indicated diagrammatically three of such register mechanisms at RM1, RM2 and RM3, connected in parallel to the conductors 100*r*, 101*r* and 102*r*. These conductors lead to segments No. 4 of the selectors D, D1, D2, respectively. With the zero contact *z'* associated with each of these register mechanisms is connected a pair of plugs MP and MP'. The zero contacts associated with the register mechanism shown in Figs. 11 and 12 are for the same purpose as the zero contacts described in connection with the register shown in Figs. 6 and 7. They are for the purpose of automatically breaking the circuit through the electromagnets of the register motor when the register passes through zero. In Fig. 11 these zero contacts are shown at *z* and *z'* mounted upon an insulating block 190.

It will be remembered that in connection with the discharging of the individual wage-registers in Fig. 2 the zero contacts associated with the individual wage-registers had a normal tendency to remain closed, but were forced apart by an arm on the highest order numeral wheel when the register passed through zero. In the specific arrangement shown in Fig. 11 the zero contacts would normally tend to separate, but are held together by the highest order numeral wheel or by a separate wheel associated with the highest order wheel. Separation of the spring contacts in Fig. 11 is effected by the projection 191 on the spring contact *z'* dropping into the recess 192 in the highest order numeral wheel at the moment when the register is passing through zero. These spring contacts are diagrammatically indicated in Fig. 3 to show that the circuit through the electromagnets of the register mechanisms RM1, RM2, RM3 must be closed through these zero contacts.

It will be noticed that the two plugs connected with one of the zero contacts of each of the registers which, for the sake of distinction, we might call the material registers, are different in construction, in that the plug MP is wholly of metal, while the plug MP' has only the rounded head of metal, the shank portion being of insulating material, or at least insulated. The object of this difference in the construction of the two plugs is to enable the amount set up in a material register to be transferred either while the substations are discharging into the totalizing register or during a time when no such discharge is taking place. The plug MP is used to enter into the proper total cost register the amount set up in the material register at a time when the substations are discharging, while the plug MP' is used when no substation discharges take place in the totalizing register. If, now, we desire to transfer into, say, total cost register TC6 an amount set up in the material register RM1 while the substations are discharging, plug MP is inserted in the jack j6, whereupon the circuit through the register RM1 is closed as follows: from the positive main M to conductor 108, through the impulse disks ID, switch S, conductors 109, 110, 111, brushes $d$ of the selectors D, D1, D2. It will be remembered that in tracing the circuits for the discharging of the substations into the totalizing registers we learned that the selector shaft SS' is actuated one-fourth of a revolution for every revolution made by the transfer controller shaft TCS, and that such one-quarter revolution was sufficient to move the selector brushes of the selectors from corresponding segments to the next succeeding segments. So that the segments 1, 2, 3 and 4 of the selectors D, D1, D2 are engaged successively by the associated selector brushes $d$, the object of this arrangement being to select successively the various substations for connection with the central station. Now, the material registers, as already mentioned in the introductory part of this specification, constitute to all intents and purposes a substation, which differs from the other substations in that it is manually controlled. We may, therefore, properly refer to the registers RM1, RM2, RM3 as the material substation MS. Such a substation is diagrammatically indicated in Fig. 1, and I have also placed these reference letters on Fig. 3 in order to make the connection between Fig. 1 and Fig. 3 more apparent. The selectors D, D1, D2, therefore, connect the substations, including the material substation, one after the other to cause their entries or accumulations to be transferred into the proper total cost registers at the central station. Continuing our tracing of the circuit for transferring the amount of material from register RM1 into totalizing register TC6, we see that from segments No. 4 the current impulses pass over conductors 100r, 101r, 102r, through the register RM1, through plug MP, spring contact 116 of jack j6, conductor 117' through totalizing register TC6, from there through conductors 118, 119, 120, and then back to the negative main M', through the impulse disks ID' as described in connection with the discharging circuits from the substations. Once, therefore, during every revolution of the selector shaft SS', the material substation MS will be selected for connection with the central station to enter into the proper total cost register a predetermined amount, as for instance, an amount representing the cost of material to be charged to a particular job.

The actuation of the shaft 163 of the register mechanism by the associated "three-phase" motor is such that the numeral wheels will be actuated reversely. So that as the impulses pass through the electromagnets of the "three-phase" motor associated with the material register, the amount initially set up in the register by hand will be decreased step by step until the entire amount has been transferred into the proper totalizing register and the numeral wheels of the material register have been all brought back to zero. As soon as this happens the zero contacts are opened by the highest order wheel as above explained, and the register is cut out of circuit. Now, if it should be desired to enter into some particular totalizing register the cost of material during a period in which no discharging takes place from the other substations, the plug MP' is used instead of the plug MP. The circuit through the material register would in this last instance be the same as that already described when the plug MP is used. The difference in the use of the two plugs is that in order to permit the circuit to be closed through the total cost register TC6 from the substations S1, S2 and S3 when the selector brushes of the selectors engage the proper segments, it is necessary that the plug MP connect the spring contacts 114 and 116. The discharge plugs DP, as will be remembered, permitted the discharge of only substations S1, S2 and S3 into the central station. The plug MP permits the discharge of all of the substations, the reservoir substations as well as the material substations. On the other hand, the plug MP', being insulated except for a metallic head, does not when inserted connect the spring contacts 114 and 116, but closes the circuit of the material register through the spring contact 116, leaving the discharge circuits of the other substations open when the selector brushes of the selectors engage segments 1, 2 and 3. In other words, when the dummy plugs are in the jacks of the central station switchboard, it shows at once that the substations are transferred into the totalizing registers.

If it is desired to add the cost of material to any particular job while such transfer is going on, the dummy plug is removed and the plug MP of one of the material registers inserted in place in order to maintain the circuit connections the same as they were when the dummy plug was in place. If, however, it is desired to enter the cost of material in any one of the totalizing registers and it is found that no dummy plug is in the jack assigned to that register, then the plug MP' is inserted in the jack, for when no dummy plug is found in a jack the indication is that no substations are discharging into that particular totalizing register; to insert the plug MP under such conditions would be not only to enter the cost of material into the totalizing register, but to connect up the reservoir sub-stations for discharging at a time when such discharge might not be desired. The use of the plug MP', however, permits the entry of material without disturbing the reservoir substations. The advantages, therefore, of having different kinds of plugs at the central station switchboard are: first, discharging only the reservoir substations; second, discharging the reservoir substations as well as the material substations; third, discharging only the material substations without affecting the reservoir substations; fourth, clearing the total cost registers at the central station without affecting the entries in the reservoir substations or the material substations.

The principle of storing, or relaying and transferring, need not be confined to the job registers, but may be applied to other entry-receiving devices in various ways in a system of this character. The controlling register in the substation need not necessarily be a register with order-wheels, but could be a simple train of gears, or simply one wheel whose range of rotation was always less than one revolution.

In the foregoing description of one embodiment of my invention I have not endeavored to enumerate all of the many advantages residing in the different features and arrangements of my invention, nor have I tried to set forth the many uses to which such features and arrangements might be put other than the specific use herein described for the sake of illustration only. It is, moreover, obvious that certain details and features of my invention may be employed without the use of certain other features, and that many modifications will be apparent to those skilled in the art without departing from the scope of the invention as defined in the appended claims.

Having now described my invention, what I claim as new and desire to secure by Letters Patent of the United States is:

1. In an electromagnetic register-actuating device, the combination of a field-magnet structure composed of sections adapted to be successively energized at a predetermined frequency, an armature structure arranged to be actuated by the magnetic flux as each section is energized, and a register connected with said armature structure to be actuated thereby at a rate dependent upon the frequency at which the different sections are successively energized.

2. In an electromagnetic register-actuating device, the combination of a plurality of electromagnets adapted to be successively energized at a predetermined frequency, a rotatable shaft, a corresponding plurality of armatures fixed upon said shaft and so arranged thereon that whenever an electromagnet is energized its associated armature receives a one-step advancement, and a register connected with said shaft to be actuated thereby at a rate dependent upon the frequency of cyclic energization of said electromagnets.

3. In an electromagnetic register-actuating device, the combination of a field-magnet structure composed of sections arranged in groups, the sections of each group being adapted to be successively energized at a predetermined frequency, an armature structure associated with each group of sections and arranged to be actuated as each section of that group is energized, a register, and differential transmission-connections between the armature structures and said register, whereby the amount of actuation of the register is proportional to the sum of the actuations of the individual armature structures.

4. In an electromagnetic register-actuating device, the combination of a plurality of electromagnets arranged in groups, the electromagnets of each group being adapted to be successively energized at a predetermined frequency, a rotatable shaft associated with each group of electromagnets, a plurality of armatures fixed upon said shaft, there being an armature for each electromagnet, the armatures belonging to a group of electromagnets being so arranged upon the shaft that whenever an electromagnet of that group is energized the associated armature receives a one-step advancement, a register, and differential transmission-connections between the armature-shafts and the register, whereby the register is actuated at a rate proportional to a sum of the rates at which the groups of electromagnets are energized.

5. The combination of a register, mechanism for actuating the same in a positive direction, a second mechanism for actuating the register in a negative direction, transmission-connections between said register and said mechanisms for actuating the register at a rate proportional to the difference between the rates of actuation of the mechanisms, and means carried by said register for automatically rendering said second mechanism inoperative every time the register reaches zero, but rendering said mechanism operative as soon as the register goes above zero.

6. In an accounting system, the combination of a source of current impulses, a plurality of circuits leading therefrom, a plurality of groups of registers in said circuits, the individual registers of the different groups being correspondingly classified, selector-mechanism for successively connecting the registers of each group with said source, and connections for concurrently operating said corresponding registers in parallel circuits.

7. In an accounting system, the combination of a plurality of groups of registers, the individual registers of the different groups being correspondingly classified, means for actuating said registers, connections between said registers and said actuating means for actuating the registers of each group one at a time and actuating corresponding registers concurrently, and means for totalizing the actuations of corresponding registers.

8. In an accounting system, the combination of a source of current impulses, a plurality of circuits leading therefrom, a plurality of groups of registers in said circuits, the individual registers of the different groups being correspondingly classified, selector-mechanism for successively connecting the registers of each group with said source, connections for concurrently operating the corresponding registers in parallel circuits, and means for totalizing the actuations of corresponding registers.

9. In a device of the class described, the combination of a plurality of individual registers, means for actuating the same, a generic register, and mechanism for accumulating the actuations of said individual registers and transferring the accumulations into said generic register.

10. In an accounting system, the combination of a plurality of groups of registers, each group constituting a primary unit, means for actuating said registers, a plurality of totalizing devices for receiving the actuations of said registers, said totalizing devices constituting a substation, a plurality of generic registers, one for each totalizing device, and connections between said substation and said generic registers for transferring the accumulations of said totalizing devices into their respective generic registers.

11. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, a plurality of generic registers, and connections between said substations and said generic registers for discharging the substations into the appropriate generic registers.

12. In a device of the class described, the combination of a plurality of individual registers, time-controlled means for actuating the same at predetermined rates, a generic register, mechanism for totalizing the actuations of said individual registers and transferring the total into said generic register, and manually controlled means for actuating said generic register any desired amount, independently of the actuations coming from said totalizing mechanism.

13. In a device of the class described, the combination of a register, manually controlled mechanism for entering into said register any desired amount, electrically operated devices for decreasing the amount registered, and time controlled mechanism for sending electric impulses through said devices to operate them to any desired degree.

14. The combination with a register, of means for periodically actuating the same, said actuating means comprising a time-controlled mechanism and a manually-controlled mechanism, and connections between said register and said mechanisms for periodically connecting first one and then the other of said mechanisms with the register.

15. In combination, a register, means for actuating the same to accumulate entries, a second register, and means for discharging said entries into said second register as fast as they accumulate.

16. The combination of a register, a mechanism having numeral-wheels, means for actuating said numeral-wheels to set up any desired amount, a shaft, a three-phase electromagnetic actuating device for driving said shaft, connections between said shaft and said numeral-wheels for actuating the latter as the shaft is rotated, means for automatically stopping the operation of said electromagnetic device when the numeral-wheels reach their zero position, and means for actuating said register proportionately to the amount of actuation of said shaft, whereby the set-up on said numeral-wheels is transferred into said register.

17. In a system of the class described, a source of electrical impulses, a plurality of registers, circuit-connections between said source and said registers, a switching device in said circuit-connections, said switching device including a series of plugs, and a separate register adapted to be connected with said source only through said plugs when the same are in the "out" position, each of said plugs serving to automatically break the circuit of said separate register through the plug when the latter is in the "in" position.

18. In a system of the class described, the combination of a source of electrical impulses, a workman's wage-register, a job-register, a waste-wage register, connections between said source and said registers, and a switching device including a plug provided with a pair of normally closed contacts for closing the circuit of the workman's register through the waste-wage register when the plug is in the "out" position, said contacts being open when the plug is in the "in" position to close the circuit of the workman's register through the job-register.

19. In an electromagnetic register-actuating device, the combination of a plurality of electromagnets adapted to be successively energized at a predetermined frequency, a rotatable shaft, a corresponding plurality of armatures fixed upon said shaft and so arranged thereon that whenever an electromagnet is energized its associated armature receives a one-step advancement, the direction of advancement being determined by the order in which the electromagnets are energized, and a register connected with said shaft to be actuated thereby at a rate dependent upon the frequency of the cyclic energization of said electromagnets.

20. In an electromagnetic actuating device, the combination of a plurality of electromagnets adapted to be successively energized, an armature for each electromagnet provided with radial polar extensions, a rotatable shaft upon which the armatures are rigidly mounted to be each actuated whenever its associated electromagnet is energized, and a register connected with said shaft to be actuated thereby at a rate dependent upon the frequency of cyclic energization of said electromagnets.

21. In an electromagnetic actuating device, the combination of a plurality of electromagnets adapted to be successively energized, an armature for each electromagnet provided with radial polar extensions, a rotatable shaft upon which the armatures are rigidly mounted to be actuated whenever its associated electromagnet is energized, the mounting of the armatures on the shaft being such that the direction of rotation of the shaft is determined by the order in which the electromagnets are energized, and a register connected with said shaft to be actuated thereby at a rate dependent upon the frequency of cyclic energization of said electromagnets.

22. In an electromagnetic register-actuating device, the combination of three electromagnets adapted to be successively energized at a predetermined frequency, a rotatable shaft, three armatures fixed upon said shaft, there being an armature for each electromagnet so arranged that whenever an electromagnet is energized its associated armature receives a one-step advancement, the direction of advancement being determined by the order in which the electromagnets are energized, and a register connected with said shaft to be actuated thereby at a rate dependent upon the frequency at which said electromagnets are cyclically energized.

23. In an electromagnetic register-actuating device, the combination of three electromagnets adapted to be successively energized, an armature for each electromagnet provided with radial polar extensions, a rotatable shaft upon which the armatures are rigidly mounted to be each actuated whenever its associated electromagnet is energized, the mounting of the armatures on the shaft being such that the direction of rotation of the shaft is determined by the order in which the electromagnets are energized, and a register connected with said shaft to be actuated thereby at a rate dependent upon the frequency of cyclic energization of said electromagnets.

24. In an electromagnetic register-actuating device, the combination of a plurality of electromagnets arranged in groups, the electromagnets of each group being adapted to be successively energized at a predetermined frequency, a rotatable shaft associated with each group of electromagnets, a plurality of armatures fixed upon said shaft, there being an armature for each electromagnet, the armatures belonging to a group of electromagnets being so arranged upon the shaft that whenever an electromagnet of that group is energized the associated armature receives a one-step advancement, a driving member, differential transmission-connections between said driving member and said armature shaft for actuating said driving member at a rate proportional to the sum of the rates of actuation of said armature shafts, an additional group of electromagnets adapted to be successively energized, a rotatable shaft associated with said last-mentioned electromagnets, an armature for each electromagnet fixed upon said shaft to be actuated whenever its associated electromagnet is energized, a second driving member connected with said last-mentioned armature shaft to be actuated proportionately to the rate of actuation of said armature shaft, said driving members being rotatable in opposite directions, a register, and a differential connection between said register and said driving members for actuating the register at a rate proportional to the difference between the rates of actuation of said driving members.

25. In an electromagnetic register-actuating device, the combination of a plurality of electromagnets arranged in groups, the electromagnets of each group being adapted to be successively energized at a predetermined frequency, a rotatable shaft associated with each group of electromagnets, a plurality of armatures fixed upon said shaft, there being an armature for each electromagnet, the armatures belonging to a group of electromagnets being so arranged upon the shaft that whenever an electromagnet of that group is energized the associated armature receives a one-step advancement, a driving member, differential transmission-connections between said driving member and said armature shaft for actuating said driving member at a rate proportional to the sum of the rates of actuation of said armature shafts, an additional group of electromagnets adapted to be successively energized, a rotatable shaft associated with said last-mentioned electromagnets, an armature for each electromagnet fixed upon said shaft to be actuated whenever its associated electromagnet is energized, a second driving member connected with said last-mentioned armature shaft to be actuated proportionately to the rate of actuation of said armature shaft, said driving members being rotatable in opposite directions, a register, a differential connection between said register and said driving members for actuating the register at a rate proportional to the difference between the rates of actuation of said driving members, and means for automatically rendering said second driving member inoperative whenever the register reaches zero, but rendering the same operative as soon as the register goes above zero.

26. In an electromagnetic register-actuating device, the combination of a plurality of electromagnets, an armature associated with each electromagnet to be actuated thereby whenever the same is energized, a member connected with all of the armatures to receive the actuations thereof, and a register connected with said member to be actuated thereby at a rate proportional to the frequency of cyclic energization of said electromagnets.

27. In an electromagnetic register-actuating device, the combination of three electromagnets, an armature associated with each electromagnet to be actuated thereby whenever the same is energized, a member connected with all of the armatures to receive the actuations thereof, and a register connected with said member to be actuated thereby at a rate proportional to the frequency of cyclic energization of said electromagnets, the direction of actuation of the register being determined by the order in which the electromagnets are energized.

28. In an accounting system, the combination of a plurality of groups of registers, the individual registers of the different groups being correspondingly classified, a source of three-phase current impulses common to all of said registers, circuit connections between said common source and said registers for actuating the registers of each group one at a time and actuating corresponding registers concurrently, and means for totalizing the actuations of corresponding registers.

29. In an accounting system, the combination of a source of current, a plurality of circuits leading therefrom, switching mechanism included in said circuit connections for sending out cycles of impulses, each cycle consisting of three impulses differing in phase, a plurality of groups of registers adapted to be included in said circuits to be actuated by said impulse-cycles, the individual registers of the different groups being correspondingly classified, selector-mechanism for successively connecting the registers of each group with said source, connections for concurrently operating the corresponding registers in parallel circuits, and means for totalizing the actuations of corresponding registers.

30. In an accounting system, the combination with a source of three-phase current impulses, of a plurality of registers adapted to be actuated by said impulses in a direction determined by the order in which the impulses are impressed upon the registers.

31. In an accounting system, the combination of a plurality of individual registers, a source of three-phase current impulses for actuating the same, the direction of actuation being determined by the order in which the impulses are impressed upon the registers, mechanism for accumulating the actuations of said registers, a generic register, and connections between said mechanism and said generic register for transferring the accumulations of said mechanism into said generic register.

32. In an accounting system, the combination of a plurality of groups of registers, each group constituting a primary unit, the individual registers of the different groups being correspondingly classified, a source of three-phase current impulses, circuit connections between said source and said registers for actuating the registers of each group one at a time and actuating the corresponding registers concurrently, a plurality of totalizing devices for receiving the actuations of said registers, said totalizing devices constituting a substation, a plurality of generic registers, one for each totalizing device, and connections between said substation and said generic registers for transferring the accumulations of said totalizing devices into their respective generic registers.

33. In an accounting system, the combination of a plurality of groups of registers, each group constituting a primary unit, means for actuating said registers, a plurality of totalizing devices for receiving the actuations of said registers, said totalizing devices constituting a substation, a plurality of generic registers, one for each totalizing device, and readily adjustable connections between said substation and said generic registers for discharging the entries of said totalizing devices into their respective registers as fast as said entries accumulate or subsequently thereto.

34. In an accounting system, the combination of a plurality of groups of registers, each group constituting a primary unit, the individual registers of the different groups being correspondingly classified, a source of three-phase current impulses, circuit connections between said source and said registers for actuating the registers of each group one at a time and actuating corresponding registers concurrently, a plurality of totalizing devices for receiving the actuations of said registers, said totalizing devices constituting a substation, a plurality of generic registers, one for each totalizing device, and readily adjustable connections between said substation and said generic registers for discharging the entries of said totalizing devices into their respective generic registers as fast as said entries accumulate or subsequently thereto.

35. In an accounting system, the combination of a plurality of sets of registers, each set comprising several groups, the registers of each group constituting a primary unit, the individual registers of the different groups being correspondingly classified, a source of three-phase current impulses, circuit connections between said source and said registers for actuating the registers of each group one at a time and actuating corresponding registers concurrently, a plurality of totalizing devices associated with each set of registers for receiving the actuations thereof, the totalizing devices for the registers of each set constituting a substation, a plurality of generic registers, and connections between said substations and said generic registers for discharging the substations into their appropriate generic registers.

36. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, a plurality of generic registers, and readily adjustable connections between said substations and said generic registers for discharging the substations into their appropriate generic registers as fast as the entries accumulate in said substations or subsequently thereto.

37. In an accounting system, the combination of a plurality of sets of registers, each set comprising several groups, the registers of each group constituting a primary unit, the individual registers of the different groups being correspondingly classified, a source of three-phase current impulses, circuit connections between said source and said registers for actuating the registers of each group one at a time and actuating corresponding registers concurrently, a plurality of totalizing devices associated with each set of registers for receiving the actuations thereof, the totalizing devices for the registers of each set constituting a substation, a plurality of generic registers, and readily adjustable connections between said substations and said generic registers for discharging the substations into the appropriate generic registers as fast as the entries accumulate in the substations or subsequently thereto.

38. In an accounting system, the combination of a source of current, circuit connections leading therefrom, a plurality of switches included in said circuit connections, a time-controlled shaft for operating said switches to cause cycles of impulses through said circuit connections, each cycle consisting of three impulses differing in phase, and a register adapted to be included in said circuit connections to be actuated by said impulses in a direction determined by the order in which the cyclical impulses are impressed upon the circuit.

39. In an accounting system, the combination of a source of current, circuit connections leading therefrom, a plurality of switches included in said circuit connections, a time-controlled shaft for operating said switches to cause cycles of impulses through said circuit connections, each cycle consisting of three impulses differing in phase, a plurality of registers adapted to be included in said circuit connections to be actuated by said impulses in a direction determined by the order in which the cyclical impulses are impressed upon the circuit, and selector-mechanism interposed in said circuit connections to select the registers for actuation one at a time.

40. In an accounting system, the combination of a source of current, circuit connections leading therefrom, a plurality of switches included in said circuit connections, a time-controlled shaft for operating said switches to cause cycles of impulses through said circuit connections, each cycle consisting of three impulses differing in phase, a workman's wage-register adapted to be included in said circuit connections to be actuated by said impulses, rate-controlling mechanism interposed in said circuit connections to control the frequency of the cyclical impulses impressed upon the wage-register in accordance with a predetermined rate of wages, and a time-register adapted to be actuated by said cyclical impulses at a rate dependent upon the rate of actuation of said time-controlled shaft.

41. The combination of a source of current, circuit connections leading therefrom, switching mechanism in said circuit connections for causing cycles of impulses, each cycle consisting of three impulses differing in phase, and a register adapted to be included in said circuit connections to be actuated by said three-phase impulses.

42. The combination of a source of current, circuit connections leading therefrom, switching mechanism in said circuit connections for causing cycles of impulses, each cycle consisting of three impulses differing in phase, a wage-register adapted to be included in said circuit connections to be actuated by said three-phase impulses, and rate mechanism for controlling the frequency of the cyclical impulses impressed upon the wage-register in accordance with a predetermined rate of wages.

43. The combination of a source of current, circuit connections leading therefrom, switching mechanism in said circuit connections for causing cycles of impulses, each cycle consisting of three impulses differing in phase, a plurality of wage-registers, selector-mechanism for automatically connecting said wage-registers one at a time for actuation by said impulses, and rate mechanism for controlling the frequency of the cyclical impulses impressed upon the connected wage-register in accordance with a predetermined rate of wages.

44. In an accounting system, the combination of a source of current, circuit connections leading therefrom, clock-controlled switching mechanism associated with said circuit connections for causing cycles of current impulses, each cycle consisting of three impulses differing in phase, and a register adapted to be included in said circuit connections to be actuated by said three-phase impulses.

45. In an accounting system, the combination of a source of current, circuit connections leading therefrom, clock-controlled switching mechanism associated with said circuit connections for causing cycles of current impulses, each cycle consisting of three impulses differing in phase, a wage-register adapted to be included in said circuit connections to be actuated by said three-phase impulses, a rate mechanism for controlling the frequency of the cyclical impulses impressed upon the wage-register in accordance with a predetermined rate of wages, and a time-register adapted to be actuated by said cyclical impulses at a rate dependent upon the rate of actuation of said switching mechanism.

46. In an accounting system, the combination of a source of current, circuit connections leading therefrom, clock-controlled switching mechanism associated with said circuit-connections for causing cycles of current impulses, each cycle consisting of three impulses differing in phase, a plurality of wage-registers, selector-mechanism for automatically connecting said wage-registers one at a time for actuation by said impulses, rate mechanism for controlling the frequency of the cyclical impulses impressed upon the connected wage-register in accordance with a predetermined rate of wages, a plurality of time-registers, one for each wage-register, and circuit connections for said time-registers whereby the selection of a wage-register for actuation automatically selects the appropriate time-register for concurrent actuation at a rate dependent upon the rate of actuation of said switching mechanism.

47. In an accounting system, a rate-controlling mechanism comprising, in combination, a time-controlled driving shaft, a plurality of rate-disks rigidly mounted thereon, a second shaft, a plurality of clutch-disks rotatably mounted on said second shaft and adapted each to engage one of the rate-disks, the gear-ratios between the two sets of disks varying in accordance with the rates of wages represented, a shiftable coupling member mounted upon said second shaft beside each clutch-disk and rotatable with said shaft, electromagnetic means for actuating any coupling member to connect the two shafts together through the proper rate-disk, and a circuit closing device operated by said second shaft.

48. In an accounting system, a rate-controlling mechanism comprising, in combination, a time-controlled driving shaft, a second shaft, a plurality of normally inoperative gear connections between said shafts, the gear-ratios of said connections being in accordance with the rates of wages represented thereby, electromagnetic means for rendering any one of said connections operative to cause actuation of said second shaft at a predetermined rate, and a circuit closing device operated by said second shaft.

49. In an accounting system, the combination of a source of current impulses, a plurality of wage-registers, a plurality of job-registers, circuit connections between said registers and said source of impulses, means for connecting any desired wage-register in circuit, a plurality of jacks, a plurality of workman's job-plugs coöperating with said jacks to select the desired job-register for concurrent actuation with the connected wage-register, said plugs consisting each of a pair of normally closed contacts which become separated when the plug is inserted in any one of the jacks, a waste-wage register, and circuit connections for said waste-wage register through said plug contacts, whereby the waste-wage register is included in circuit for concurrent actuation with a wage-register when the workman's job-plug is "out" but is automatically disconnected and a job-register connected when the plug is inserted in a jack.

50. In an accounting system, the combination of a workman's job-plug provided with a pair of normally closed contacts which become separated when the plug is inserted in the jack, a register having its circuit closed through said contacts when the plug is "out", and a second register having its circuit closed when the plug is "in".

51. In an accounting system, the combination of a source of three-phase current impulses, a plurality of wage-registers, circuit connections between said wage-registers and said source of impulses for actuating said registers one at a time by said impulses, a plurality of job-registers, means for connecting any job-register with said source simultaneously with any wage-register, and a rate mechanism for controlling the frequency of the three-phase impulses in accordance with a predetermined rate of wages.

52. In an accounting system, the combination of a source of three-phase current impulses, a plurality of wage-registers, circuit connections between said wage-registers and said source of impulses for actuating said registers one at a time by said impulses, a plurality of job-registers, means for connecting any job-register with said source simultaneously with any wage-register, a rate mechanism for controlling the frequency of the three-phase impulses in accordance with a predetermined rate of wages, and a generic register for totalizing the actuations of the wage-registers.

53. In an accounting system, the combination of a source of current impulses, circuits leading therefrom, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, and connections for concurrently operating corresponding registers in parallel circuits.

54. In an accounting system, the combination of a source of current, circuits leading therefrom, clock-controlled switching mechanism associated with said circuits for causing cycles of current impulses, each cycle consisting of three impulses differing in phase, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, and connections for concurrently operating corresponding registers in parallel circuits.

55. In an accounting system, the combination of a source of current impulses, circuits leading therefrom, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices for receiving the actuations of said registers, said totalizing devices constituting a substation, a plurality of generic registers, one for each totalizing device, and connections between said substation and said generic registers for transferring the accumulations of said totalizing devices into their respective generic registers.

56. In an accounting system, the combination of a source of current, circuits leading therefrom, a clock-controlled switching mechanism associated with said circuits for causing cycles of current impulses, each cycle consisting of three impulses differing in phase, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices for receiving the actuations of said registers, said totalizing devices constituting a substation, a plurality of generic registers, one for each totalizing device, and connections between said substation and said generic registers for transferring the accumulations of said totalizing devices into their respective generic registers.

57. In an accounting system, the combination of a plurality of groups of registers, each group constituting a primary unit, means for actuating said registers, a plurality of totalizing devices for receiving the actuations of said registers, said totalizing devices constituting a substation, a wage-total register connected in circuit to totalize the actuations of the wage-registers of each group, a plurality of generic registers, one for each totalizing device, and connections between said substation and said generic registers for transferring the accumulations of said totalizing devices into their respective generic registers.

58. In an accounting system the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, a wage-total register connected in circuit to totalize the actuations of the wage-registers of each group, a plurality of generic registers, and connections between said substations and said generic registers for discharging the substations into the appropriate generic registers.

59. In an accounting system, the combination of a source of current impulses, circuits leading therefrom, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices for receiving the actuations of said registers, said totalizing devices constituting a substation, a wage-total register connected in circuit to totalize the actuations of the wage-registers of each group, a plurality of generic registers, one for each totalizing device, and connections between said substation and said generic registers for transferring the accumulations of said totalizing devices into their respective generic registers.

60. In an accounting system, the combination of a source of current, circuits leading therefrom, clock-controlled switching mechanism associated with said circuits for causing cycles of current impulses, each cycle consisting of three impulses differing in phase, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices for receiving the actuations of said registers, said totalizing devices constituting a substation, a wage-total register connected in circuit to totalize the actuations of the wage-registers of each group, a plurality of generic registers, one for each totalizing device, and connections between said substation and said generic registers for transferring the accumulations of said totalizing devices into their respective generic registers.

61. In an accounting system, the combination of a source of current impulses, circuits leading therefrom, a plurality of sets of registers in said circuits, each set comprising several groups and each group comprising time-registers and wage-registers, the registers of each group constituting a primary unit, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices associated with each set of registers for receiving the actuations thereof, the totalizing devices for the registers of each set constituting a substation, a plurality of generic registers, and connections between said substations and said generic registers for discharging the substations into the appropriate generic registers.

62. In an accounting system, the combination of a source of current impulses, circuits leading therefrom, a plurality of sets of registers in said circuits, each set comprising several groups and each group comprising time-registers and wage-registers, the registers of each group constituting a primary unit, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices associated with each set of registers for receiving the actuations thereof, the totalizing devices for the registers of each set constituting a substation, a wage-total register connected in circuit to totalize the actuations of the wage-registers of each group, a plurality of generic registers, and connections between said substations and said generic registers for discharging the substations into the appropriate generic registers.

63. In an accounting system, the combination of a source of current, circuits leading therefrom, clock-controlled switching mechanism associated with said circuits for causing cycles of current impulses, each cycle consisting of three impulses differing in phase, a plurality of sets of registers in said circuits, each set comprising several groups and each group comprising time-registers and wage-registers, the registers of each group constituting a primary unit, the individual registers of the different groups being correspondingly classified, selector mechanism for connecting the wage-registers of each group successively with said source, there being a time-register connected simultaneously with each wage-register, connections for concurrently operating said corresponding registers in parallel circuits; a plurality of totalizing devices associated with each set of registers for receiving the actuations thereof, the totalizing devices for the registers of each set constituting a substation, a plurality of generic registers, and connections between said substations and said generic registers for discharging the substations into the appropriate generic registers.

64. In an accounting system, the combination of a source of current, circuits leading therefrom, clock-controlled switching mechanism associated with said circuits for causing cycles of current impulses, each cycle consisting of three impulses differing in phase, a plurality of sets of registers in said circuits, each set comprising several groups and each group comprising time-registers and wage-registers, the registers of each group constituting a primary unit, the individual registers of the different groups being correspondingly classified, selector mechanism for connecting the wage-registers of each group successively with said source, there being a time-register connected simultaneously with each wage-register, connections for concurrently operating corresponding registers in parallel circuits, a plurality of totalizing devices associated with each set of registers for receiving the actuations thereof, the totalizing devices for the registers of each set constituting a substation, a wage-total register connected in circuit to totalize the actuations of the wage-registers of each group, a plurality of generic registers, and connections between said substations and said generic registers for discharging the substations into the appropriate generic registers.

65. In an accounting system, the combination of a source of current, circuits leading therefrom, clock-controlled switching mechanism associated with said circuits for causing cycles of current impulses, each cycle consisting of three impulses differing in phase, a plurality of groups of registers in said circuits, each group comprising time-registers and wage-registers, the individual registers of the different groups being correspondingly classified, selector mechanism for connecting the wage-registers of each group successively with said source, there being a time-register connected simultaneously with each wage-register, connections for concurrently operating corresponding registers in parallel circuits, and a rate-mechanism for controlling the frequency of the cyclical impulses through the wage-circuits in accordance with predetermined rates of wages.

66. In an accounting system, the combination of a source of current, circuits leading therefrom, clock-controlled switching mechanism associated with said circuits for causing cycles of current impulses, each cycle consisting of three impulses differing in phase, a plurality of groups of registers in said circuits, each group comprising time-registers and wage-registers, the individual registers of the different groups being correspondingly classified, selector-mechanism for connecting the wage-registers of each group successively with said source, there being a time-register connected simultaneously with each wage-register, connections for concurrently operating corresponding registers in parallel circuits, a rate-mechanism for controlling the frequency of the cyclical impulses through the wage-circuits in accordance with predetermined rates of wages, a plurality of totalizing devices for receiving the actuations of said registers, said totalizing devices constituting a substation, a plurality of generic registers, one for each totalizing device, and connections between said substation and said generic registers for transferring the accumulations of said totalizing devices into their respective registers.

67. In an accounting system, the combination of a source of current, circuits leading therefrom, clock-controlled switching mechanism associated with said circuits for causing cycles of current impulses, each cycle consisting of three impulses differing in phase, a plurality of sets of registers in said circuits, each set comprising several groups and each group comprising time-registers and wage-registers, the registers of each group constituting a primary unit, the individual registers of the different groups being correspondingly classified, selector mechanism for connecting the wage-registers of each group successively with said source, there being a time-register connected simultaneously with each wage-register, connections for concurrently operating said corresponding registers in parallel circuits, a rate mechanism for controlling the frequency of the cyclical impulses through the wage circuits in accordance with predetermined rates of wages, a plurality of totalizing devices associated with each set of registers for receiving the actuations thereof, the totalizing devices of the registers of each set constituting a substation, a plurality of generic registers, and connections between said substations and said generic registers for discharging the substations into the appropriate generic registers.

68. In an accounting system, the combination of a source of current, circuits leading therefrom, switching devices included in said circuits for causing cycles of impulses therethrough, a plurality of registers adapted to be actuated by said cyclical impulses, and means for operating said switching devices in reverse directions, the operation of said devices in one direction causing the registers to accumulate while the operation of said devices in the reverse direction causes the registers to decumulate.

69. In an accounting system, the combination of a source of current, circuits leading therefrom, switching devices included in said circuits for causing cycles of impulses therethrough, a plurality of registers adapted to be actuated by said cyclical impulses, means for operating said switching devices in reverse directions, the operation of said devices in one direction causing the registers to accumulate while the operation of said devices in the reverse direction causes the registers to decumulate, and means for automatically opening the circuit of a register when the latter reaches zero position.

70. In an accounting system, the combination of a source of current, circuits leading therefrom, switching devices included in said circuits for causing cycles of impulses therethrough, a plurality of individual registers adapted to be actuated by said cyclical impulses, a totalizing register for totalizing the actuations of said individual registers, means for operating said switching devices in reverse directions, the operation of said devices in one direction causing the individual registers to accumulate, while the operation of said devices in the reverse direction causes the said registers to decumulate, and means for preventing actuation of said totalizing register during the decumulating operation.

71. In an accounting system, the combination of a source of current, circuits leading therefrom, switching devices included in said circuits for causing cycles of impulses therethrough, a plurality of individual registers adapted to be actuated by said cyclical impulses, a totalizing register for totalizing the actuations of said individual registers, means for operating said switching devices in reverse directions, the operation of said devices in one direction causing the individual registers to accumulate, while the operation of said devices in the reverse direction causes said registers to decumulate, means for preventing actuation of said totalizing register during the decumulating operation, and means for automatically opening the circuit of a register when the latter reaches zero position.

72. In an accounting system, the combination of a plurality of groups of registers, the registers of each group being correspondingly classified, means for actuating the registers at predetermined rates in a forward direction, a source of current impulses, selector mechanism for successively connecting the registers of each group with such source for decumulation, connections for concurrently operating corresponding registers in parallel circuits, and a generic register for totalizing the entries cleared from corresponding registers.

73. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, the totalizing devices of the different substations being correspondingly classified, a plurality of generic registers constituting a central station, there being a generic register for each group of corresponding totalizing devices, and connections between said substations and said central station for simultaneously discharging the totalizing devices of a substation into their respective generic registers, but discharging the corresponding totalizing devices successively into their generic registers.

74. In an accounting system, the combination of a source of current, circuits leading therefrom, switching devices in said circuits, means for operating said switching devices to cause cycles of current impulses, each cycle consisting of three impulses differing in phase, a plurality of sets of registers adapted to be actuated by said cyclical impulses in a direction determined by the order in which the impulses are impressed upon the circuits, each set of registers comprising several groups, the registers of each group constituting a primary unit, means for actuating said registers, a plurality of totalizing devices associated with each set of registers for receiving the actuations thereof, the totalizing devices for the registers of each set constituting a substation, the totalizing devices of the different substations being correspondingly classified, a plurality of generic registers constituting a central station, there being a generic register for each group of corresponding totalizing devices, and connections between said substations and said central station for simultaneously discharging the totalizing devices of a substation into their respective generic registers, but discharging the corresponding totalizing devices successively into their generic registers.

75. A registering device comprising, in combination, a series of suitably ordered numeral-wheels, differential gears for connecting said numeral-wheels together to permit actuation of each numeral-wheel independently of and without affecting the other numeral-wheels, a universal locking bar for engaging the central members of said differential gears to permit operation of the device only through the lowest-order numeral-wheel, and means for readily adjusting said bar into locking and unlocking position.

76. In an accounting system, the combination of a plurality of specific registers, means for actuating the same in an accumulating direction, a generic register, means for successively discharging the entries of said specific registers into said generic register, and means for entering into said generic register any desired amount during the discharging operation.

77. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, a plurality of generic registers, connections between said substation and said generic registers for discharging the substations into the appropriate generic registers, and means for entering into any generic register any desired amount during the discharging operation.

78. In an accounting system, the combination of a plurality of specific registers, means for actuating the same in an accumulating direction, a generic register, means for successively discharging the entries of said specific registers into said generic register, a register mechanism having numeral-wheels, means for actuating said numeral-wheels to set up any desired amount, and connections between said mechanism and said generic register for automatically transferring said amount into the generic register during the discharging operation.

79. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, a plurality of generic registers, connections between said substations and said generic registers for discharging the substations into the appropriate generic registers, a register mechanism having numeral-wheels, means for actuating said numeral-wheels to set up any desired amount, and connections between said mechanism and said generic registers for automatically transferring said amount into any generic register during the discharging operation.

80. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, the totalizing devices of the different substations being correspondingly classified, a plurality of generic registers constituting a central station, there being a generic register for each group of corresponding totalizing devices, connections between said substations and said central station for simultaneously discharging the totalizing devices of a substation into their respective generic registers, but discharging the corresponding totalizing devices successively into their generic registers, and means for entering into any generic register any desired amount during the discharging operation.

81. In an accounting system, the combination of a plurality of sets of registers, each set comprising several groups, the registers of each group constituting a primary unit, means for actuating said registers, a plurality of totalizing devices associated with each set of registers for receiving the actuations thereof, the totalizing devices for the registers of each set constituting a substation, the totalizing devices of the different substations being correspondingly classified, a plurality of generic registers constituting a central station, there being a generic register for each group of corresponding totalizing devices, connections between said substations and said central station for simultaneously discharging the totalizing devices of a substation into their respective generic registers, but discharging the corresponding totalizing devices successively into their generic registers, a register mechanism having numeral-wheels, means for actuating said numeral-wheels to set up any desired amount, and connections between said mechanism and said generic registers for automatically transferring said amount into any generic register during the discharging operation.

82. In an accounting system, the combination of a plurality of sets of registers, each comprising several groups, the registers of each group constituting a primary unit, a source of current impulses for actuating said registers, a plurality of totalizing devices associated with each set of registers for receiving the actuations thereof, the totalizing devices for the registers of each set constituting a substation, a plurality of generic registers, and connections between said substations and said generic registers for discharging the substations into the appropriate generic registers, said connections including jacks and plugs associated with the generic registers for readily adjusting the connections for discharging the substations either concurrently or intermittently with the accumulations therein.

83. In an accounting system, the combination of a plurality of time-controlled register mechanisms adapted to receive entries a manually controlled register mechanism adapted to receive any desired entry, a totalizing register, and connections between said register mechanisms and said totalizing register for successively discharging the entries of said register mechanisms into said totalizing register, said connections being readily adjustable to cause discharging only of the time-controlled mechanisms or only of the manually controlled mechanisms.

84. In an accounting system, the combination of a plurality of time-controlled register mechanisms adapted to receive entries, a totalizing register, a source of current impulses for actuating said register and said register mechanisms, selector mechanism for successively connecting said register mechanisms with said totalizing register to discharge their entries in the same, a manually controlled register mechanism adapted to receive any desired entry, and readily adjustable plug-connections for discharging said manually controlled register mechanism into said totalizing register either when the time-controlled register mechanisms are connected for discharging or when they are not so connected.

85. In combination, a plurality of rate controlling devices, a corresponding plurality of operating mechanisms, and electromagnetic devices for selectively connecting any rate device with its corresponding operating mechanism.

86. In combination, a plurality of electric impulse producing mechanism, a driving device for operating each mechanism at a characteristic rate, said devices being normally disconnected from said mechanisms, and electromagnetic devices for selectively connecting said impulse producing mechanisms with their driving devices.

87. In a system of the class described, the combination of a plurality of rate circuits each supplying electric impulses at a predetermined rate when closed, said rate circuits being normally open, and a corresponding plurality of independent control circuits each adapted to control the closure of the corresponding rate circuit.

In witness whereof, I hereunto subscribe my name this 19th day of May A. D. 1909.

WILLIAM J. CRUMPTON.

Witnesses:
C. H. TALLMADGE,
A. A. THOMAS.

Copies of this patent may be obtained for five cents each, by addressing the "Commissioner of Patents, Washington, D. C."